United States Patent
Shimauchi et al.

(10) Patent No.: US 10,455,148 B2
(45) Date of Patent: Oct. 22, 2019

(54) IMAGE CAPTURING DEVICE TO CAPTURE IMAGE OF A SUBJECT BASED ON A COMMUNICATION PROCESS

(71) Applicant: SONY CORPORATION, Tokyo (JP)

(72) Inventors: Kazuhiro Shimauchi, Tokyo (JP); Seijiro Inaba, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/112,444

(22) PCT Filed: Jan. 16, 2015

(86) PCT No.: PCT/JP2015/051018
§ 371 (c)(1),
(2) Date: Jul. 19, 2016

(87) PCT Pub. No.: WO2015/115203
PCT Pub. Date: Aug. 6, 2015

(65) Prior Publication Data
US 2016/0337582 A1 Nov. 17, 2016

(30) Foreign Application Priority Data
Jan. 28, 2014 (JP) .................... 2014-013299

(51) Int. Cl.
*H04N 5/232* (2006.01)
*G03B 7/091* (2006.01)

(52) U.S. Cl.
CPC ..... *H04N 5/23222* (2013.01); *H04N 5/23219* (2013.01); *H04N 5/23293* (2013.01);
(Continued)

(58) Field of Classification Search
None
See application file for complete search history.

(56) References Cited

U.S. PATENT DOCUMENTS

| | | | |
|---|---|---|---|
| 2008/0037841 A1* | 2/2008 | Ogawa | H04N 5/232 382/118 |
| 2011/0128397 A1* | 6/2011 | Kang | H04N 5/232 348/222.1 |

(Continued)

FOREIGN PATENT DOCUMENTS

| | | |
|---|---|---|
| JP | 02-093527 A | 4/1990 |
| JP | 02-93527 A | 4/1990 |

(Continued)

OTHER PUBLICATIONS

Office Action for JP Patent Application No. 2015-559868, dated Nov. 6, 2018, 03 pages of Office Action and 02 pages of English Translation.

*Primary Examiner* — Justin P. Misleh
(74) *Attorney, Agent, or Firm* — Chip Law Group

(57) ABSTRACT

Provided are an image capturing device, an image capturing method, and a program which allow an image of a subject to be captured in a more appropriate manner. A communication control unit controls a communication process of making a communication with the subject. An image capturing control unit performs image capturing control of controlling image capturing, which is performed by the image capturing unit that captures an image of the subject, in correspondence with the communication process. For example, the present technology is applicable to a digital camera that captures still images or moving images, and other electronic apparatuses equipped with a function of capturing still images or moving images.

17 Claims, 19 Drawing Sheets

(52) U.S. Cl.
CPC ............ *G03B 7/091* (2013.01); *H04N 5/2327* (2013.01); *H04N 5/23206* (2013.01)

(56) References Cited

U.S. PATENT DOCUMENTS

| | | | | |
|---|---|---|---|---|
| 2011/0134269 A1* | 6/2011 | Kim | ................... | H04N 5/23293 |
| | | | | 348/222.1 |
| 2012/0105676 A1* | 5/2012 | Park | ................... | H04N 5/23219 |
| | | | | 348/231.3 |
| 2012/0182460 A1* | 7/2012 | Nagashima | ............ | H04N 5/232 |
| | | | | 348/345 |
| 2015/0103002 A1* | 4/2015 | Yoon | ..................... | G06F 3/0488 |
| | | | | 345/157 |

FOREIGN PATENT DOCUMENTS

| | | | |
|---|---|---|---|
| JP | HEI 02-093527 | A | 4/1990 |
| JP | 2003-219218 | A | 7/2003 |
| JP | 2005-010512 | A | 1/2005 |
| JP | 2006-287285 | A | 10/2006 |
| JP | 2008-058791 | A | 3/2008 |
| JP | 2009-246832 | A | 10/2009 |
| JP | 2011-019051 | A | 1/2011 |

* cited by examiner

FIG. 8

| DESIRED STATE | INDUCEMENT PROCESS |
|---|---|
| SMILING FACE | • PLURALITY OF "SMILE" MESSAGES (DIFFERENT IN OUTPUT TIMING, EXPRESSION (MILD EXPRESSION, STRONG EXPRESSION, AND THE LIKE), AND THE LIKE) AND FOR EVERY SEX<br>• PLURALITY PATTERNS OF IMAGES WHICH ARE DIFFERENT FOR EVERY AGE GROUP<br>• CONTENT POPULAR IN EACH REGION<br>• PLURALITY OF GESTURES |
| STATIONARY STATE WITHOUT (MOVEMENT BLURRING) | • PLURALITY OF "DON'T MOVE" MESSAGES (DIFFERENT IN OUTPUT TIMING, EXPRESSION, AND THE LIKE)<br>• PLURALITY OF PATTERNS OF IMAGES DIFFERENT FOR EVERY AGE GROUP AND FOR EVERY SEX |
| STATE IN THAT SUBJECT FACES CONFRONTING SIDE (FACES CAMERA) | • PLURALITY OF "LOOK OVER HERE" MESSAGES (DIFFERENT IN OUTPUT TIMING, EXPRESSION, AND THE LIKE)<br>• OUTPUTTING OF CANDY<br>• OUTPUTTING OF VOICE<br>• FLASH |
| STATE IN WHICH SUBJECT OPENS EYES | • PLURALITY OF "OPEN YOUR EYES" MESSAGES (DIFFERENT IN OUTPUT TIMING, EXPRESSION, AND THE LIKE)<br>• ... |
| STATE IN WHICH SUBJECT CLOSES MOUTH | • PLURALITY OF "CLOSE YOUR MOUTH" MESSAGES (DIFFERENT IN OUTPUT TIMING, EXPRESSION, AND THE LIKE)<br>• ... |
| STATE IN WHICH POSTURE IS GOOD | • PLURALITY OF "PULL YOUR CHIN" MESSAGES (DIFFERENT IN OUTPUT TIMING, EXPRESSION, AND THE LIKE)<br>• ... |

IMAGE CAPTURING DEVICE TO CAPTURE IMAGE OF A SUBJECT BASED ON A COMMUNICATION PROCESS

CROSS REFERENCE TO RELATED APPLICATIONS

This application is a U.S. National Phase of International Patent Application No. PCT/JP2015/051018 filed on Jan. 16, 2015, which claims priority benefit of Japanese Patent Application No. 2014-013299 filed in the Japan Patent Office on Jan. 28, 2014. Each of the above-referenced applications is hereby incorporated herein by reference in its entirety.

TECHNICAL FIELD

The present technology relates to an image capturing device, an image capturing method, and a program, and particularly to, an image capturing device, an image capturing method, and a program which allow an image of a subject to be captured in an appropriate manner.

BACKGROUND ART

For example, there is suggested an autonomous image capturing device that autonomously captures an image of the subject on the basis of an image capturing planning while making a communication with a subject (person to be imaged) so as to appropriately capture an image by flexibly coping with a variation in image capturing environment or image capturing situations (for example, refer to Patent Document 1).

CITATION LIST

Patent Document

Patent Document 1: Japanese Patent Application Laid-Open No. 2005-010512

SUMMARY OF THE INVENTION

Problems to be Solved by the Invention

However, in a case of capturing an image of a subject while making a communication with the subject, it may be difficult to appropriately capture an image of the subject only through image capturing control such as control of a shutter speed regardless of the communication with the subject.

The present technology has been made in consideration of the above-described situation, and an object thereof is to allow an image of a subject to be captured in an appropriate manner.

Solutions to Problems

According to an aspect of the present technology, there is provided an image capturing device including a communication control unit that controls a communication process of making a communication with the subject, and an image capturing control unit that performs image capturing control of controlling image capturing, which is performed by the image capturing unit that captures an image of the subject, in correspondence with the communication process. In addition, according to another aspect of the present technology, there is provided a program that allows a computer to functions as the image capturing device.

According to still another aspect of the present technology, there is provided an image capturing method including a step of performing image capturing control of controlling image capturing, which is performed by an image capturing unit that captures an image of a subject, in correspondence with a communication process of making a communication with the subject.

In the image capturing device, the image capturing method, and the program, image capturing control of controlling image capturing, which is performed by an image capturing unit that captures an image of a subject, is performed in correspondence with a communication process of making a communication with the subject.

Furthermore, the image capturing device may be an independent device, or an internal block that constitutes one device.

In addition, the program may be provided in a state of being transmitted through a transmission medium, or in a state of being recorded on a recording medium.

Effects of the Invention

According to the present technology, it is possible to appropriately capture an image of a subject.

Furthermore, the effect described here is not limited, and may be any one effect described in the present disclosure.

BRIEF DESCRIPTION OF DRAWINGS

FIG. 8 is a view illustrating an example of the desired state and the inducement process.

MODE FOR CARRYING OUT THE INVENTION

<Embodiment of Image Capturing Device to which Present Technology is Applied>

Figure 1:
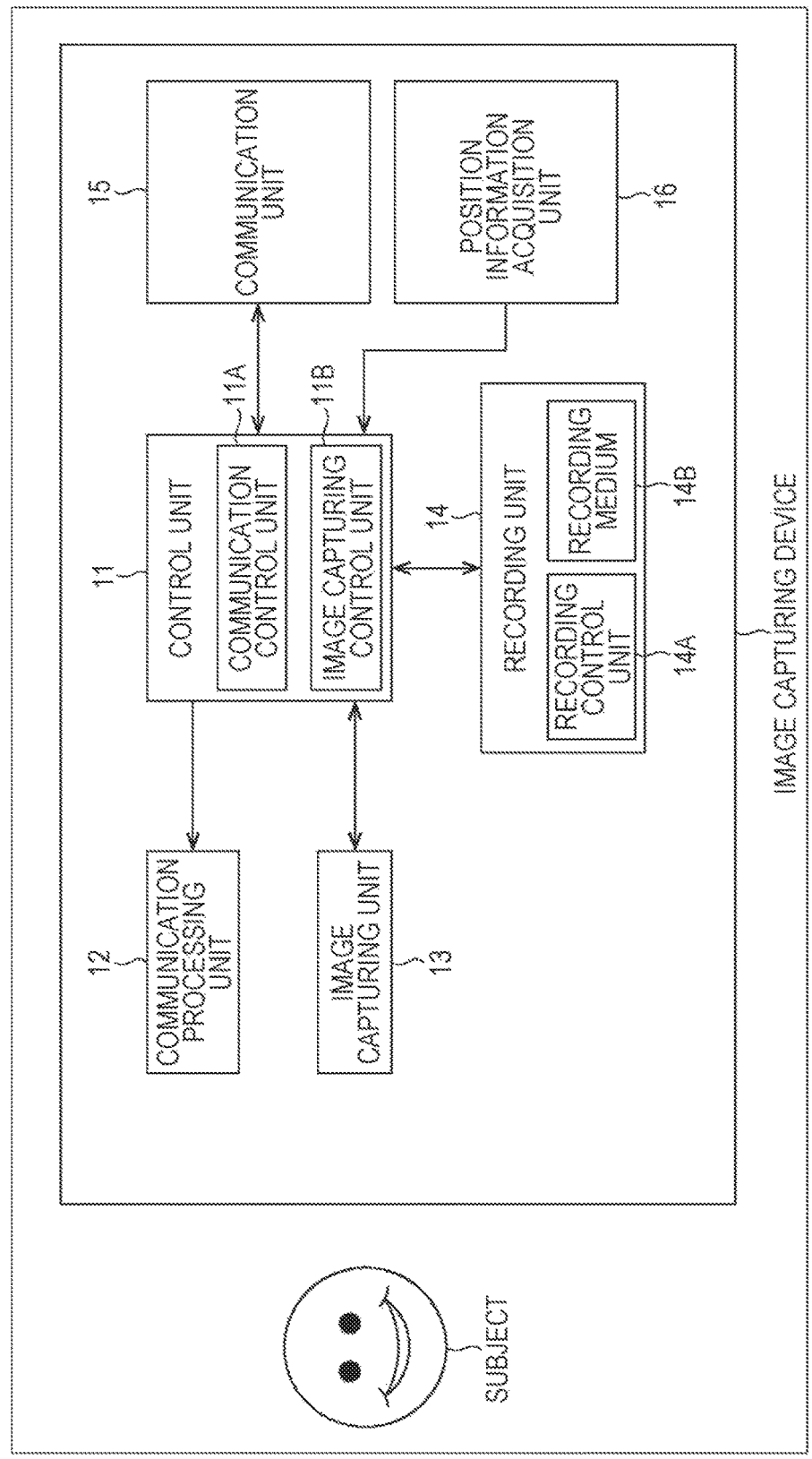
FIG. 1 is a block diagram illustrating a configuration example of an embodiment of an image capturing device to which the present technology is applied.

FIG. 1 is a block diagram illustrating a configuration example of an embodiment of an image capturing device to which the present technology is applied.

In FIG. 1, for example, the image capturing device is a digital camera that captures a moving image or a still image, and includes a control unit 11, a communication processing unit 12, an image capturing unit 13, a recording unit 14, a communication unit 15, and a position information acquisition unit 16.

The control unit 11 controls the entirety of the image capturing device.

In addition, the control unit 11 performs processing necessary for an image that is captured by the image capturing unit 13 and is supplied from the image capturing unit 13, and supplies the resultant processed image to the recording unit 14 to be recorded therein.

In addition, the control unit 11 includes a communication control unit 11A and an image capturing control unit 11B.

The communication control unit 11A controls a communication process performed by the communication processing unit 12.

The image capturing control unit 11B performs image capturing control of controlling image capturing of an image to be captured by the image capturing unit 13.

The communication processing unit 12 performs (executes) a communication process of making a communication with a subject according to control of the control unit 11 (the communication control unit 11A thereof).

Here, as the communication process, it is possible to employ an arbitrary process of making a communication with the subject. That is, as the communication process, for example, processes such as displaying of an image, outputting of a voice, and gesture by a robot can be employed.

Furthermore, in FIG. 1, the communication processing unit 12 is included in the image capturing device, but the communication processing unit 12 may be configured as a device separated from the image capturing device. In a case where the communication processing unit 12 is configured as a device separated from the image capturing device, the control unit 11 (the communication control unit 11A thereof) makes a wireless communication or a wire communication with the communication processing unit 12 to control the communication process performed by the communication processing unit 12.

For example, the image capturing unit 13 includes an image sensor such as a complementary metal oxide semiconductor (CMOS) sensor, and captures an image of a subject according to the image capturing control performed by the control unit 11 (the image capturing control unit 11B thereof). In addition, the image capturing unit 13 supplies a captured image obtained by capturing an image of the subject to the control unit 11.

The recording unit 14 records the captured image that is supplied from the control unit 11.

That is, the recording unit 14 includes a recording control unit 14A and a recording medium 14B. The recording control unit 14A performs recording control of recording the captured image, which is supplied from the control unit 11, on the recording medium 14B. For example, the recording medium 14B is a recording medium such as a memory card and a disc, and may be a recording medium capable of being detached from the recording unit 14, or a recording medium that is fixed in the recording unit 14.

The communication unit 15 makes a communication through a network such as the Internet according to control of the control unit 11. The control unit 11 can acquire necessary information (a content, a program, and the like), for example, from a server on the Internet by allowing the communication unit 15 to make a communication.

The position information acquisition unit 16 acquires a current position of the image capturing device by using, for example, a global positioning system (GPS) and the like, and supplies the current position to the control unit 11. The control unit 11 performs a process by using the current position, which is supplied from the position information acquisition unit 16, as necessary.

<External Appearance Configuration Example of Image Capturing Device>

Figure 2:
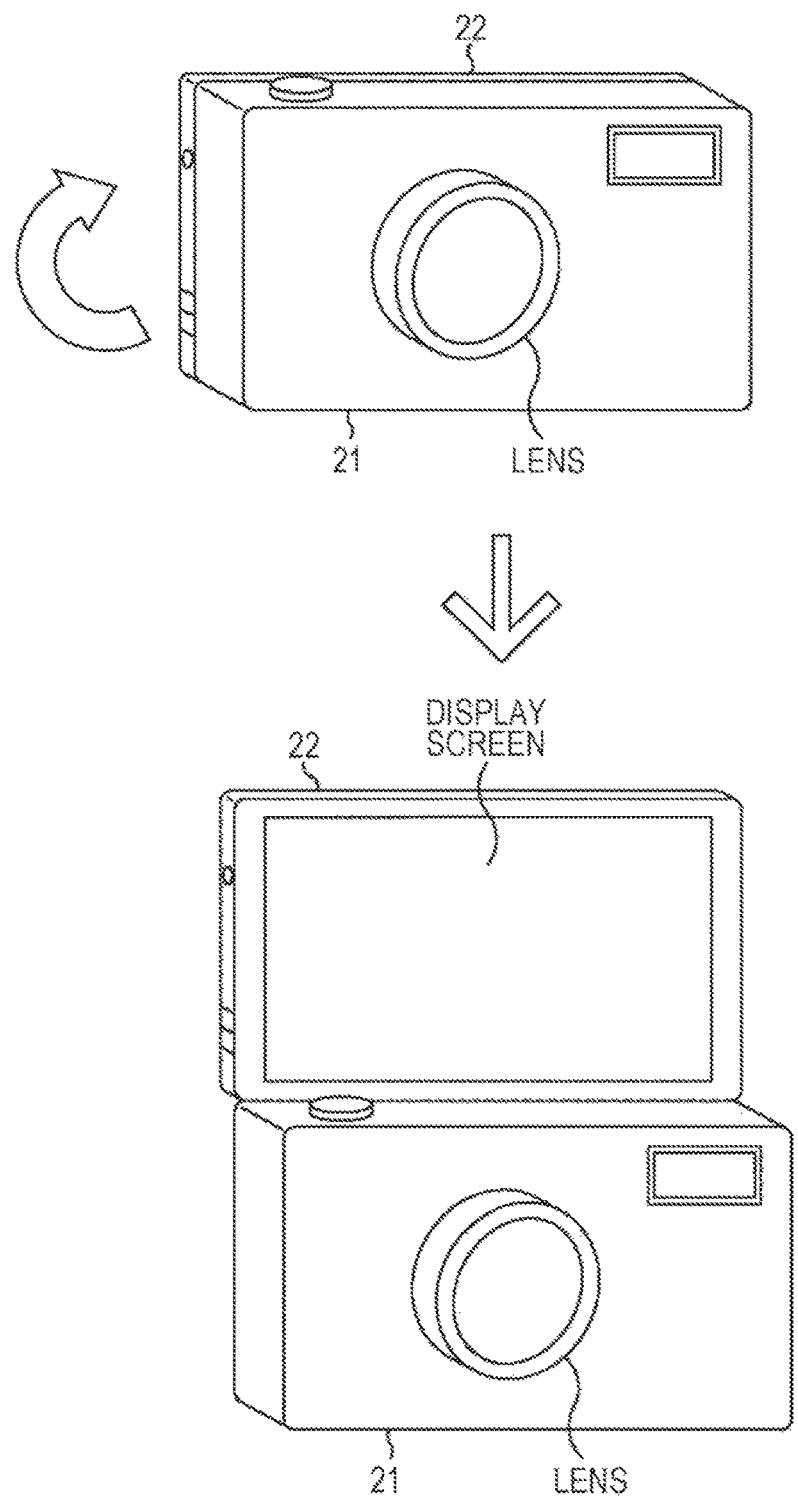
FIG. 2 is a perspective view illustrating a first external appearance configuration example of the image capturing device.

FIG. 2 is a perspective view illustrating a first external appearance configuration example of the image capturing device in FIG. 1.

In FIG. 2, the image capturing device is a digital still camera capable of capturing still images and moving images, and is constituted by a main body 21 and a liquid crystal panel 22.

The control unit 11, the image capturing unit 13, and the recording unit 14 in FIG. 1 are built in the main body 21, and a lens that condenses light to the image capturing unit 13 (image sensor thereof) is provided on a front side.

The liquid crystal panel 22 functions as the communication processing unit 12 in FIG. 1. In FIG. 2, the liquid crystal panel 22 is provided on a rear surface side of the main body 21, and is mounted to be rotatable about an upper side of the main body 21 as a rotation center.

In the image capturing device in FIG. 2, when the liquid crystal panel 22 is rotated to be opened from the main body 21, a display screen of the liquid crystal panel 22 faces a confronting side (image capturing direction). According to this, an image displayed on the display screen is presented to a subject, and communication with the subject is achieved by using the image.

That is, the liquid crystal panel 22 performs a process of displaying an image such as a predetermined message on the display screen as the communication process, and communication with the subject is achieved by using the image that is displayed on the display screen.

Furthermore, a speaker can be built in the liquid crystal panel 22 (or the main body 21). In this case, the liquid crystal panel 22 can perform a process of outputting a voice (sound) such as a predetermined message from the speaker as the communication process. In this case, communication with the subject can be achieved by using the voice that is output from the speaker.

Figure 3:
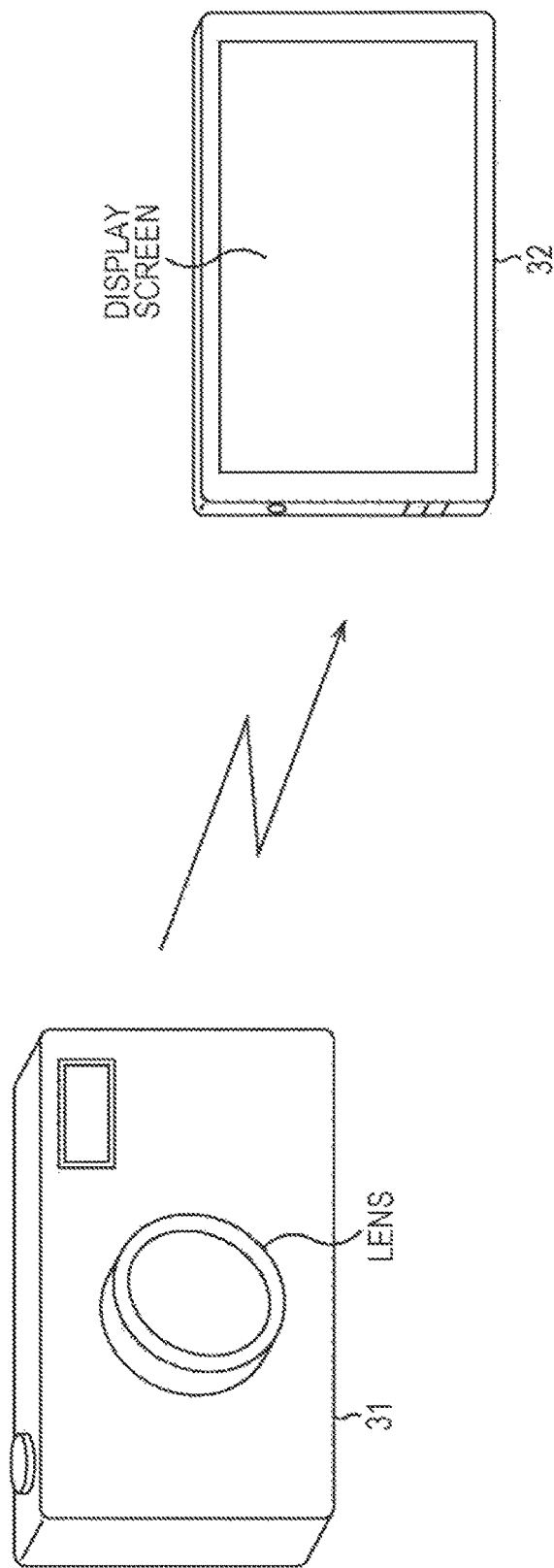
FIG. 3 is a perspective view illustrating a second external appearance configuration example of the image capturing device.

FIG. 3 is a perspective view illustrating a second external appearance configuration example of the image capturing device in FIG. 1.

In FIG. 3, the image capturing device is a digital still camera capable of capturing still images and moving images, and is constituted by a main body 31.

The main body 31 is constituted in the same manner as in the main body 21 in FIG. 2. That is, the control unit 11, the image capturing unit 13, and the recording unit 14 in FIG. 1 are built in the main body 31, and a lens that condenses light to the image capturing unit 13 is provided on a front side.

In addition, the main body 31 is configured to make a communication with an output terminal 32, which is separated from the main body 31, through wireless communication such as wireless local area network (LAN) and Bluetooth (registered trademark).

The output terminal 32 is a terminal capable of performing a communication process such as displaying of an image, outputting of a voice, and the like, and functions as the communication processing unit 12 in FIG. 1. The output terminal 32 achieves a communication with a subject by performing a communication process such as displaying of an image, outputting of a voice, and the like according to control from the main body 31 (the control unit 11 thereof) through wireless communication.

As the output terminal 32, for example, a tablet terminal can be employed. In a case of employing the tablet terminal as the output terminal 32, for example, a photographer, who captures an image of a subject by operating the main body 31 as the image capturing device, carries the output terminal 32, and presents an image displayed on the output terminal 32, and the like to the subject.

In addition, as the output terminal 32, for example, a smart phone or a glass-type wearable device, which is carried by the subject, can be employed. In a case of employing the smart phone or the wearable device, which is carried by the subject, as the output terminal 32, the subject can be presented with an image, which is displayed on the smart phone or the wearable device, and the like from the smart phone or the wearable device.

As described above, in the image capturing device in FIG. 3, communication with the subject can be achieved by using an image that is displayed on the output terminal 32 separated from the main body 31, or a voice that is output from the output terminal 32.

Furthermore, in the image capturing device in FIG. 2, the liquid crystal panel 22 can be configured to be detachable from the main body 21. In this case, the liquid crystal panel 22, which is detached from the main body 21, can be used as the output terminal 32 in FIG. 3.

In addition, in a case of employing the smart phone or the wearable device, which is carried by the subject, as the output terminal 32, in addition to the image that is displayed in the communication process and the like, a captured image of the subject, which is captured by the image capturing unit 13, can be transmitted from the main body 31 to the smartphone and the like which are carried by the subject.

In the main body 31, in a case where an image of the subject is captured in a state in which specification information for specifying the smart phone and the like, which are carried by the subject, is registered in advance, the captured image of the subject can be transmitted to the smart phone and the like, which are specified by the specification information, that is, the smart phone and the like, which are carried by the subject of which an image is captured, by searching for the specification information that specifies the smart phone and the like which are carried by the subject.

Figure 4:
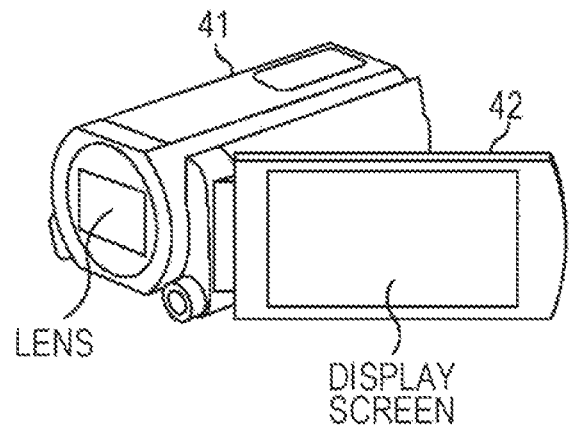
FIG. 4 is a perspective view illustrating a third external appearance configuration example of the image capturing device.

FIG. 4 is a perspective view illustrating a third external appearance configuration example of the image capturing device in FIG. 1.

In FIG. 4, the image capturing device is a digital video camera capable of capturing moving images and still images, and is constituted by a main body 41 and a liquid crystal panel 42.

The control unit 11, the image capturing unit 13, and the recording unit 14 in FIG. 1 are built in the main body 41, and a lens that condenses light to the image capturing unit 13 is provided on a front side.

The liquid crystal panel 42 functions as the communication processing unit 12 in FIG. 1. In FIG. 4, the liquid crystal panel 42 is provided on a side surface of the main body 41, and is mounted to be rotatable about one side of the main body 41 on a lens side so as to be opened from the main body 41.

In addition, the liquid crystal panel 42 is configured to be rotatable about a rotation center in a direction perpendicular to the rotation center during rotation to be opened and closed with respect to the main body 41. According to this, for example, when being closed with respect to the main body 41, the liquid crystal panel 42 can rotate to enter a state in which a display screen is accommodated on a main body 41 side, or a state in which the display screen faces an outer side.

Accordingly, in a state of being opened from the main body 41, the liquid crystal panel 42 can allow the display screen to face a subject side (image capturing direction). According to this, an image displayed on the display screen can be presented to the subject, and communication with the subject can be achieved by using the image.

That is, in the liquid crystal panel 42, a process of displaying an image such as a predetermined message on the display screen is performed as the communication process to achieve a communication with the subject by using the image that is displayed on the display screen.

Furthermore, a speaker can be built in the liquid crystal panel 42 (or the main body 41). In this case, the liquid crystal panel 42 can perform a process of outputting a voice such as a predetermined message from the speaker as the communication process. In this case, communication with the subject can be achieved by using the voice that is output from the speaker.

In addition, in FIG. 4, as is the case with FIG. 3, the output terminal 32 that is separated from the main body 41 can be allowed to function as the communication processing unit 12 in FIG. 1.

Figure 5:
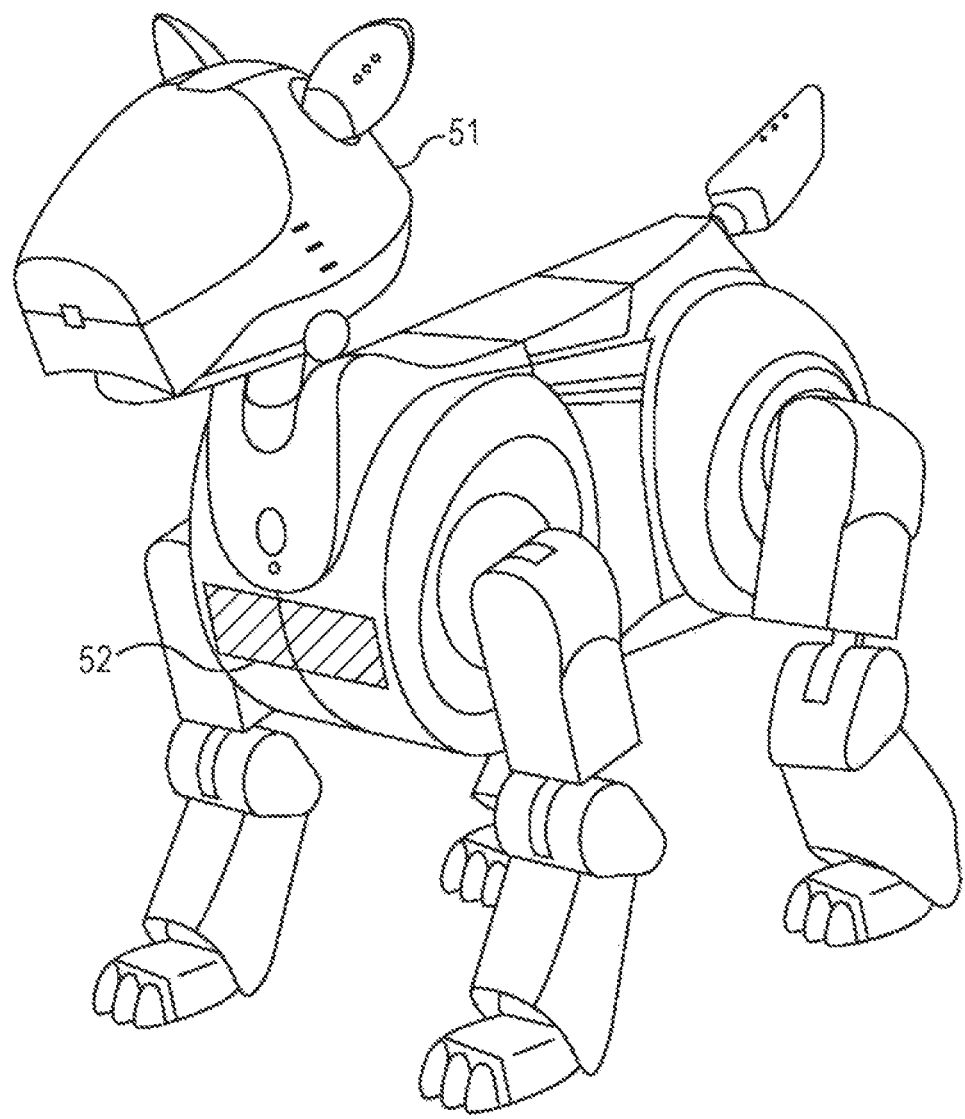
FIG. 5 is a perspective view illustrating a fourth external appearance configuration example of the image capturing device.

FIG. 5 is a perspective view illustrating a fourth external appearance configuration example of the image capturing device in FIG. 1.

In FIG. 5, the image capturing device is configured as a pet (dog) type robot. The image capturing device autonomously moves or is moved according to a remote operation by a user (a photographer or a subject) with four legs, and can capture an image.

The control unit 11, the image capturing unit 13, and the recording unit 14 in FIG. 1 are built in the pet type robot. Particularly, for example, the image capturing unit 13 is built in the head 51 of the pet type robot as an eye (eyesight) of the pet type robot.

In addition, in FIG. 5, a liquid crystal panel 52, which functions as the communication processing unit 12 in FIG. 1, is provided to the breast of the pet type robot.

The liquid crystal panel 52 performs a process of displaying an image such as a predetermined message as the communication process, and communication with the subject is achieved by using the image that is displayed in the communication process.

Furthermore, the liquid crystal panel 52 may be provided to a position other than the breast of the pet type robot, that is, for example, the abdomen. In a case where the liquid crystal panel 52 is provided at the abdomen of the pet type robot, when it enters a state in which the pet type robot stands only with the rear legs (a so-called front-leg raising state), an image that is displayed on the liquid crystal panel 52 is presented to the subject, and communication with the subject is achieved.

In addition, as a mouth of the pet type robot, a speaker can be built in the head 51 of the pet type robot, and the pet type robot can perform a process of outputting a voice such as a predetermined message from the speaker as the communication process. In this case, communication with the subject is achieved by using the voice that is output from the speaker.

In addition, in the pet type robot in FIG. 5, as is the case with FIG. 3, the output terminal 32 that is separated from the pet type robot can be allowed to function as the communication processing unit 12 in FIG. 1.

In addition, in the pet type robot in FIG. 5, gesture can be made as the communication process in addition to the displaying of the image or the outputting of the voice. As the gesture, it is possible to employ a configuration in which the head 51, the legs, the tail, and the like of the pet type robot are shaken to take a predetermined behavior. In addition, for example, the head 51 can be configured in such a manner that the mouth can be opened and closed, and a behavior of extracting candy from the mouth, and the like can be employed as the gesture that is the communication process. According to the behavior of extracting the candy from the mouth, it is possible to attract attention of children.

In addition, for example, a projector can be mounted on the pet type robot in FIG. 5, and a process of displaying an image on a screen by using the projector can be performed as the communication process.

Here, when a movable movement unit is mounted on the digital still cameras in FIGS. 2 and 3, and the digital video camera in FIG. 4, as is the case with the pet type robot in FIG. 5, the cameras can move autonomously or can be moved according to a remote operation of a user to capture an image.

Furthermore, the image capturing device in FIG. 1 is applicable to a wearable camera, a personal computer (PC), and other electronic apparatuses which are capable of being equipped with an image capturing function without limitation to the digital cameras (the digital still camera and the digital still video camera) or the (pet type) robot.

<Process of Capturing Image of Subject in Desired State>

Figure 6:
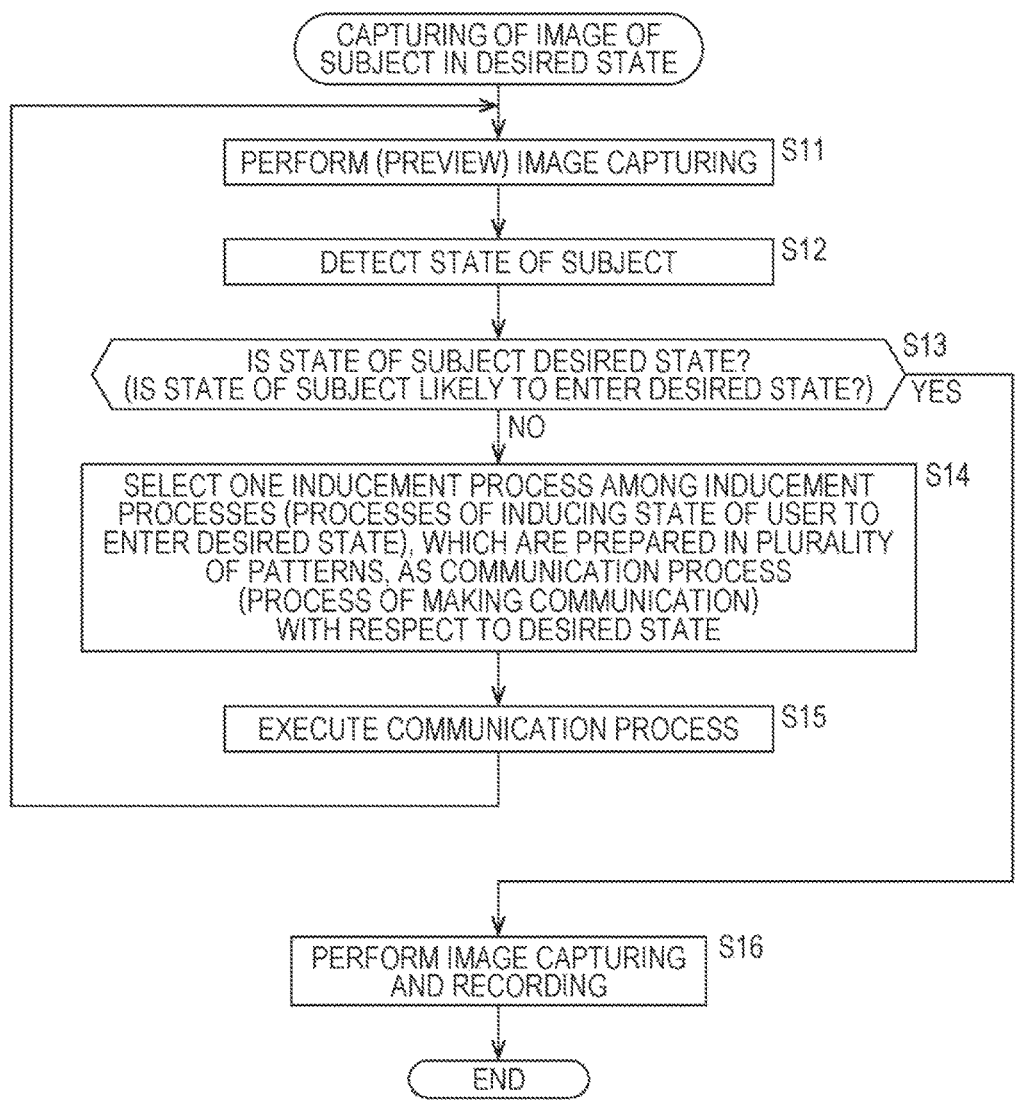
FIG. 6 is a flowchart illustrating an example of a process of capturing an image of a subject in a desired state.

FIG. 6 is a flowchart illustrating an example of a process of capturing an image of a subject in a desired state in the image capturing device in FIG. 1.

In the image capturing device in FIG. 1, the communication processing unit 12 performs the communication process, and makes a communication with a subject, for example, in the same manner as in a case where a professional photographer performs image capturing. According to the communication, the subject is allowed to behave so as to enter a desired state, and thus it is possible to capture an image of the subject in a desired state.

In step S11, the image capturing unit 13 captures an image of the subject, and supplies a captured image that is obtained through the image capturing to the control unit 11. Then, the process proceeds to step S12.

In step S12, the control unit 11 detects a state of the subject by using the captured image supplied form the image capturing unit 13, and the like, and the process proceeds to step S13. In addition, in the detection of the state of the subject, a voice of the subject, biological information such as a body temperature of the subject, and the like can be used in addition to the captured image.

In step S13, the control unit 11 determines whether or not the state of the subject is a desired state (or whether or not the state of the subject is likely to enter a desired state).

Here, examples of the desired sate include a state in which the subject has a smiling face, a state in which the subject faces a confronting side (in an image capturing direction), a state in which the subject is stationary (a state in which the subject of which an image is to be captured is stationary without movement blurring), and the like.

For example, the image capturing device can determine which state is to be set as the desired state according to an operation of a user, or in an autonomous manner.

In step S13, in a case where it is determined that the subject does not enter the desired state (or, the subject may not be likely to enter the desired state), the process proceeds to step S14. The control unit 11 selects one (or two or more) inducement process (inducement processes) among inducement processes, which are prepared in a plurality of patterns, as the communication process with respect to the desired state, and controls the communication processing unit 12 so as to execute the communication process. Then, the process proceeds to step S15.

Here, the inducement process is a process of inducing the subject to enter a predetermined state, and includes a process of inducing the subject to take a behavior so as to finally enter the desired state. "Inducement" in this specification is a broad concept that includes a direct or indirect instruction (for example, outputting of a message of "smile" or a humorous message) in order for the subject to enter a predetermined state, suggestion of information, and all behaviors which cause the subject to enter a predetermined state.

Examples of the inducement process include a process of inducing the subject to take a predetermined pose, a process of inducing image capturing of the subject to be performed in a predetermined direction, and the like.

Examples of the inducement process of inducing the subject to take a predetermined pose include a process of inducing the subject to have a smiling face (to take a pose of a smiling face), a process of inducing the subject to be stationary (to take a stationary pose), a process of inducing the subject to jump (to take a jumping pose), a process of inducing the subject to take a peace sign (V-sign) pose, a process of inducing the subject to take a pose that is theoretically preferable for portrait image capturing, a process of inducing the subject to take a pose in which an image is captured like a model, and the like.

Examples of the inducement process of inducing the image capturing of the subject to be performed in a predetermined direction include a process of inducing the subject to face a confronting side (the image capturing to be performed in a direction in which the subject faces the confronting side), a process of inducing image capturing to be performed in a direct-light direction, and the like.

A plurality of patterns of the inducement processes are prepared for every desired state.

That is, with regard to a case where the desired sate is a state in which the subject has a smiling face, examples of the plurality of patterns of inducement processes, which are prepared, include outputting of a "smile" message for directly inducing the subject to smile (displaying of an image of "smile" message, or outputting of a voice of the "smile" message), displaying of an image of a character that is popular to children, displaying of an image of a character that is popular to women, outputting of contents which are popular to respective regions, and outputting of a gesture of the pet type robot which is popular to women in a case where the image capturing device is configured as a pet type robot.

In addition, with regard to a case where the desired state is a state in which the subject is stationary, examples of the plurality of patterns of inducement processes, which are prepared, include outputting of "don't move" messages which directly induce the subject to be stationary and are different in expressions (for example, "don't move" in a mild expression, and "don't move" in a strong expression), displaying of an image of a product that is popular to men, displaying of an image of idol (for example, idol who was open published last year on a magazine intended for women, and the like) who is popular to women, and the like.

In step S14, the control unit 11 selects one inducement process among the plurality of patterns of inducement processes prepared as described above as the communication process for the desired state.

In step S15, the communication processing unit 12 executes the communication process, which is selected in step S14, according to control of the control unit 11.

Then, the process returns to from step S15 to step S11, and the processes from step S11 to step S15 are repeated until the state of the subject is determined as the desired state in step S13.

In addition, during the repetitive processes from step S11 to step S15, an inducement process, which is not previously selected as the communication process, may be selected as the communication process in step S14. The reason for this is because an effect of causing the subject to enter the desired state may be low in an inducement process that is already selected.

On the other hand, in step S13, in a case where the state of the subject is determined as the desired state, the process proceeds to step S16, and the image capturing unit 13 captures an image of the subject in the desired state, and supplies the resultant captured image to the control unit 11.

In addition, in step S16, the control unit 11 records the captured image, which is supplied from the image capturing unit 13, on the recording unit 14, and terminates the process.

Furthermore, the control unit 11 stores the communication process (the inducement process selected as the communication process), which is executed when the subject enters the desired state, in correlation with the subject as a communication history. The control unit 11 can perform ranking learning for ranking inducement processes (communication processes), with which the subject is likely to enter a desired state, for example, for an individual person, for an age group, for sex, and for an individual region of subjects by using the communication history.

After the ranking learning as described above, when an identification process of identifying the subject is performed, an inducement process, which is effective for the subject, for each attribute such as the age of the subject, the region in which the subject lives, and the sex of the subject, that is, an inducement process, with which the subject is likely to enter a desired state, can be preferentially selected as the communication process. In addition, when the communication process is performed, it is possible to perform image capturing in a state in which the subject enters a desired state in a relatively rapid manner.

Furthermore, the age or the sex of the subject can be predicted (estimated) by performing recognition of the subject by using a captured image of the subject.

In addition, in the image capturing device, the region in which the subject lives can be recognized by using a current position that is acquired by the position information acquisition unit 16, time setting in the image capturing device (time setting that is made to time in any region), and the like.

<Process of Selecting Communication Process>

Figure 7:
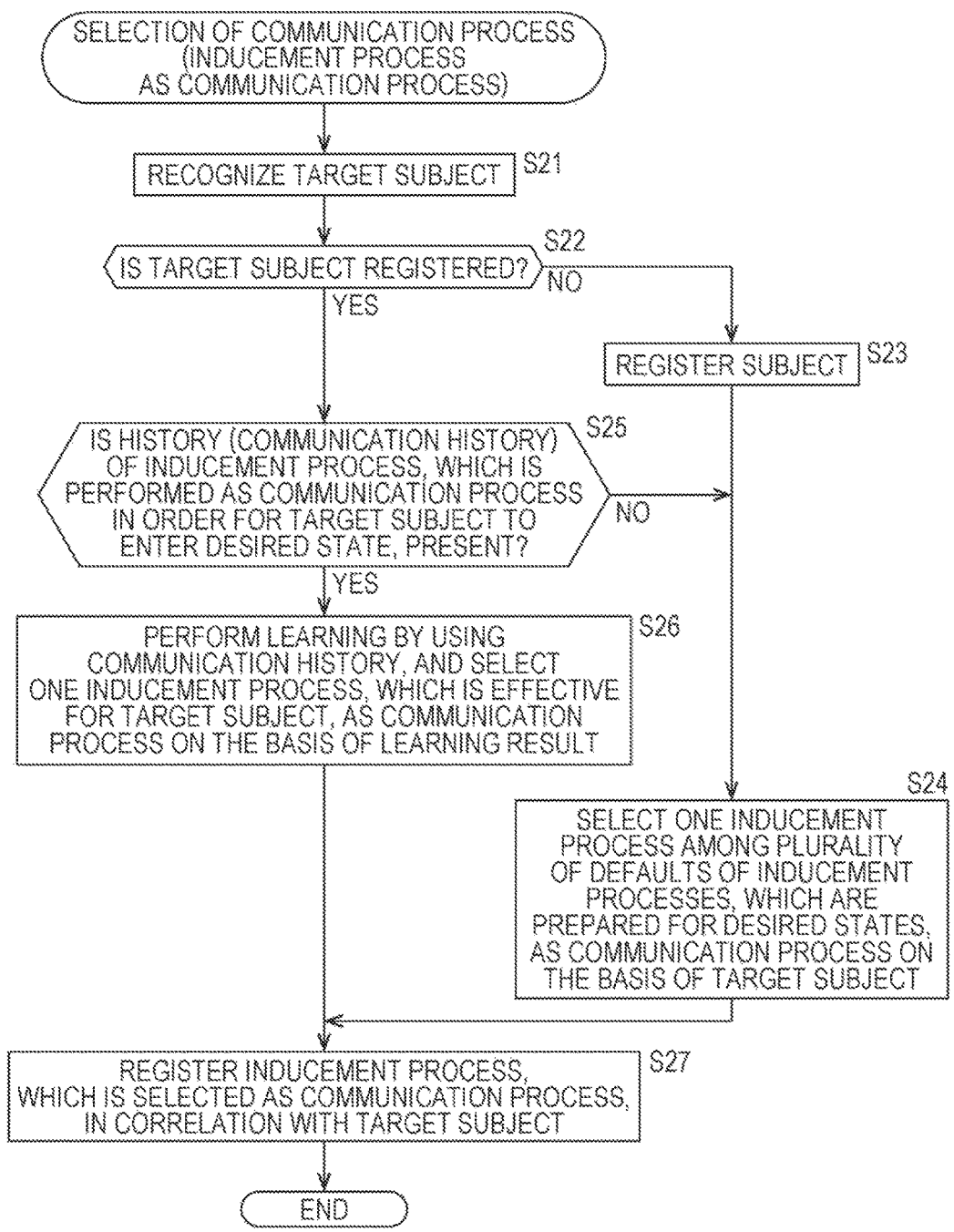
FIG. 7 is a flowchart illustrating an example of a process of selecting a communication process (inducement process as the communication process).

FIG. 7 is a flowchart illustrating an example of a process of selecting the communication process (inducement process as the communication process) in step S14 in FIG. 6.

In step S21, the control unit 11 recognizes a target subject, who appears on the captured image supplied from the image capturing unit 13, through image processing, and the process proceeds to step S22.

In step S22, the control unit 11 determines whether or not the target subject recognized in step S21 is a subject who is registered.

Here, with regard to a subject who became the target subject in the past, subject information relating to the subject is registered in a table (hereinafter, also referred to as a subject table) that is stored in a memory (not shown) that is built in the control unit 11.

The registered subject represents a subject of which subject information is registered in the subject table.

For example, a unique identification (ID), which includes a feature amount (may be an image of the subject) of the subject which is extracted from the captured image on which the subject appears, is applied to the subject information, and the subject information is registered in the subject table.

In step S22, in a case where it is determined that the target subject is not a registered subject, that is, the subject information of the target subject is not registered in the subject table, the process proceeds to step S23, and the control unit 11 registers the target subject (subject information thereof) in the subject table, and the process proceeds to step S24.

In step S24, the control unit 11 selects one inducement process among a plurality of defaults of inducement processes, which are prepared for desired states, as the communication process, for example, on the basis of the target subject, and the process proceeds to step S27.

That is, the control unit 11 can recognize an attribute such as the age of the target subject, the sex of the target subject, and a region in which the target subject lives. In a case where the above-described ranking learning is completed, in step S24, the control unit 11 can select an inducement process, which is effective for the attribute of the target subject, as the communication process on the basis of the learning result in the ranking learning and the target subject. According to the communication process that is selected in this manner, it is possible to allow the target subject to rapidly enter a desired state.

In addition, even in a case where the ranking learning is not completed, in a case of being capable of estimating an effective inducement process for each attribute of the subject, an inducement process (for example, in a case where the target subject (attribute thereof) is a young woman, an inducement process of displaying an image of an idol that is popular to young women, and the like), which is effective for the attribute of the target subject, can be selected as the communication process on the basis of the estimation result and the target subject.

In addition, in step S24, one inducement process can be randomly selected among the plurality of defaults of inducement processes, which are prepared for desired states, as the communication process regardless of the target subject.

On the other hand, in step S22, in a case where the target subject is determined as a registered subject, the process proceeds to step S25, and it is determined whether or not a communication history, which is a history of the inducement process performed as the communication process in order for the target subject to enter a desired state, is registered in the subject table in correlation with the target subject (subject information thereof).

In step S25, in a case where it is determined that the communication history related to the target subject is not registered, the process proceeds to step S24, and the above-described processes are performed.

In addition, in step S25, in a case where it is determined that the communication history related to the target subject is registered, the process proceeds to step S26. The control unit 11 performs learning for obtaining an inducement process, which is effective for the target subject to enter a desired state, by using the communication history related to the target user, and selects one inducement process, which is effective for the target subject to enter a desired state, as the communication process on the basis of a result of the learning. Then, the process proceeds to step S27.

Here, in the communication history related to the target user, the inducement process, which is performed with respect to the target subject as the communication process, is correlated with a reaction of the target subject when the inducement process is performed.

In the learning in step S26, an inducement process, which is correlated to a good reaction (reaction in which the target subject enters a desired state), is obtained as an effective inducement process.

In the communication history, as a reaction that can be correlated to the inducement process, it is possible to employ time taken for the target subject to enter a predetermined state after performing the inducement process (communication process), information indicating feeling of the target subject, which is predicted from an expression of the target subject when the inducement process is performed, and the like.

For example, in a case where the desired state is a smiling face state, an inducement process, which is correlated to a reaction in which a feeling of delight or pleasure is greater among feelings of delight, anger, sorrow, and pleasure, and time taken to have a smiling face after performing the inducement process is short, is obtained as an inducement process correlated to a good reaction during learning in step S26.

In addition, the learning in step S26 may be performed in advance.

In this manner, when an inducement process, which is performed as the communication process, is selected on the basis of the communication history related to the target subject, it is possible to select an effective inducement process as the communication process from a past communication with the target subject. In addition, with regard to the target subject, since the above-described effective inducement process is performed as the communication process with respect to the target subject, it is possible to allow the target subject to rapidly enter a desired state.

That is, for example, in a case where the desired state is a smiling face state, among communication processes performed with respect to an arbitrary target subject in the past, a communication process with which the target subject has a more smiling face is performed, and thus it is possible to effectively allow the target subject to have a smiling face.

In step S27, the control unit 11 adds (registers) the inducement process, which is selected as the communication process in step S24 or step S26, to the subject table as a communication history of the target subject, and terminates the process.

In addition, the communication process selected as described above is executed in step S15 in FIG. 6, and then a reaction of the target subject with respect to the inducement process as the communication process is correlated to the inducement process that is executed as the communication process, and is registered in the subject table.

<Examples of Desired State and Inducement Process>

FIG. 8 is a view illustrating examples of the desired state and the inducement process.

As the desired state, for example, it is possible to employ a state in which the subject has a smiling face, a state in which the subject is stationary, a state in which the subject faces a confronting side, a state in which the subject opens eyes, a state in which the subject closes mouth, a state in which a posture is good, and the like.

Examples of an inducement process of allowing the subject to enter a smiling face state (process of inducing the subject to have a smiling face) include displaying a plurality of patterns of "smile" messages which are different in output timing (based on so-called shutter (exposure) timing (image capturing timing)), an expression, and the like, displaying of a plurality of patterns of images which are set to be different for every age group and for every sex and which arouses a feeling of pleasure or delight, outputting of a plurality of contents which are different for each region and are popular for each region, outputting of a plurality of patterns of gestures which cause laughter, and the like.

Examples of an inducement process of allowing the subject to enter a stationary state include displaying of a plurality of "don't move" messages which are different in output timing, an expression, and the like, displaying of a plurality of patterns of images which are different for every age group and for every sex and which attract the attention, and the like.

Examples of an inducement process of allowing the subject to enter a confronting state include displaying of a plurality of patterns of "look over here" messages which are different in output timing, an expression, and the like, outputting of candy, outputting of a voice or flashing light that attracts the attention, and the like.

Examples of an inducement process of allowing the subject to enter a state in which eyes are open include displaying of a plurality of patterns of "open your eyes" messages which are different in output timing, an expression, and the like, and the like.

Examples of an inducement process of allowing the subject to enter a state in which mouth is closed include displaying of a plurality of patterns of "close your mouth" messages which are different in output timing, an expression, and the like, and the like.

Examples of an inducement process of allowing the subject to enter a good posture state include displaying of a plurality of patterns of "pull your chin" messages or "stretch your back" messages which are different in output timing, an expression, and the like.

In step S14 in FIG. 6 (step S24 and step S26 in FIG. 7), as illustrated in FIG. 8, the control unit 11 selects one inducement process among a plurality of patterns of inducement processes, which are prepared with respect to a desired state, as the communication process.

Furthermore, in this embodiment, one inducement process is set to be selected as the communication process for simple description, but two or more inducement processes (combination thereof) may be selected as the communication process in addition to the one inducement process.

That is, for example, in a case of allowing the subject to enter a smiling face state, two or more inducement processes such as an inducement process of displaying of a predetermined pattern of "smile" message, and an inducement process of outputting a predetermined pattern of gesture that causes laughter may be selected as the communication process.

In addition, in a case of selecting two or more inducement processes as the communication process, as the communication process, two or more inducement processes can be executed simultaneously or sequentially.

In addition, the content of the inducement process can be registered in the control unit 11 in advance. In addition, the communication unit 15 can make a communication with an external server to acquire the content of a new inducement process from the server, and the content of the inducement process, which is registered in the control unit 11, can be updated with the content of the new inducement process.

Figure 9:
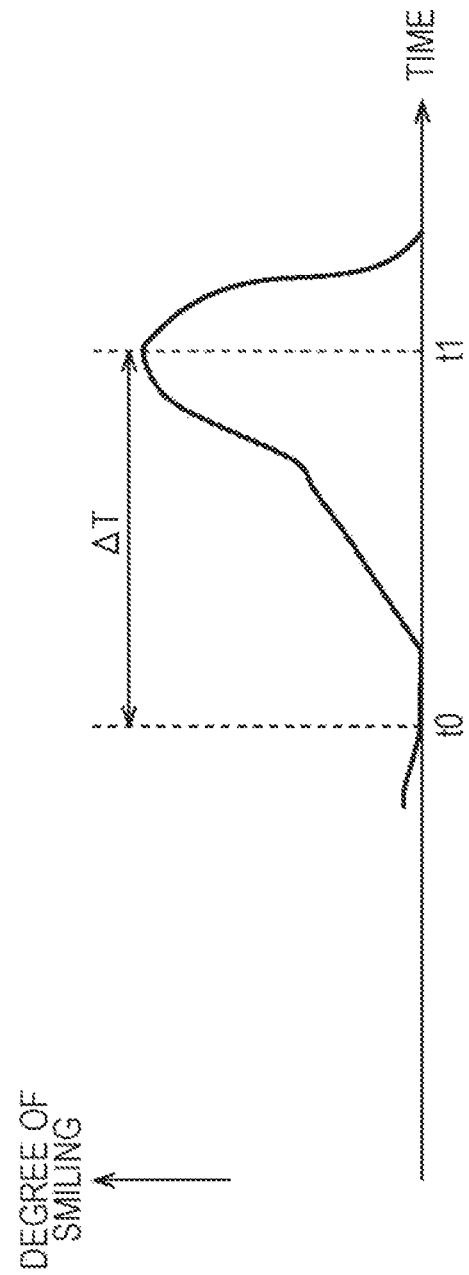
FIG. 9 is a view illustrating an example of timing of performing the inducement process.

FIG. 9 is a view illustrating an example of timing of performing the inducement process.

Here, it is assumed that the desired state is a smiling face state, and the control unit 11 obtains the degree of smile which represents how much the subject has a smiling face, and determines (detects) whether or not the subject enters a smiling face state as the desired state on the basis of the degree of smile.

FIG. 9 illustrates an example of a variation in the degree of smile with the passage of time.

The control unit 11 can allow the communication history to include ΔT from initiation time t0 of the communication process such as outputting (displaying) of a "smile" message, which was performed in the past, to time t1 (hereinafter, also referred to as reaction time), at which the degree of smile of the subject becomes the maximum, in the communication history.

In addition, in the learning in step S26 in FIG. 7, the reaction time ΔT from initiation of the communication process to time at which the degree of smile becomes the maximum is obtained for each subject, and the like by using the reaction time ΔT included in the communication history, and with regard to a communication process that is subsequently performed, for example, initiation timing of initiating the communication process such as output timing of outputting the "smile" message can be adjusted for each subject.

For example, in a case where time ΔT is obtained as the reaction time taken from outputting of the "smile" message to time at which the degree of smile becomes the maximum through the learning by using the communication history with respect to a subject, the "smile" message is output to the subject at output timing prior to shutter timing (image capturing timing) by time ΔT. According to this, it is possible to capture an image of the subject in a state in which the degree of smile is the maximum (a state in which the degree of smile is close to the maximum) (the possibility increases).

<Process of Capturing Image of Subject in State without Movement Blurring and with Smiling Face>

Figure 10:
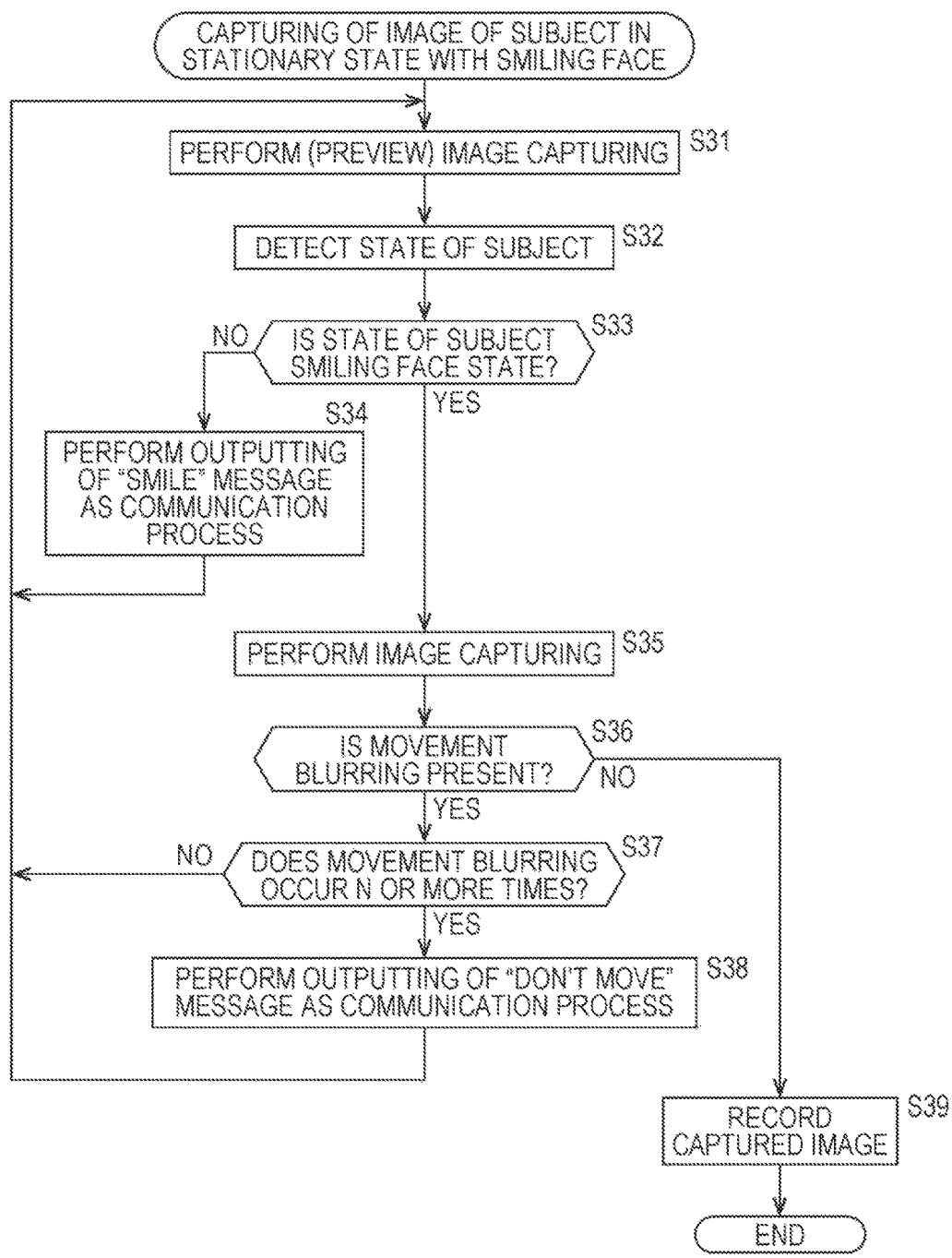
FIG. 10 is a flowchart illustrating an example of a process of capturing an image of a subject in a stationary state with a smiling face.

FIG. 10 is a flowchart illustrating an example of a process of capturing an image of a subject, who is in a stationary state with a smiling face, in the image capturing device in FIG. 1.

The image capturing device in FIG. 1 can capture an image of a subject in a plurality of desired states by employing the plurality of states as a desired state.

FIG. 10 is a flowchart illustrating a process of capturing an image of a subject in a stationary state with a smiling face by employing a smiling face state and a stationary state (state without movement blurring) as the desired state.

Furthermore, in FIG. 10, description of a process (corresponding to step S14 in FIG. 6) of selecting a communication process among a plurality of inducement processes is omitted.

In step S31, the image capturing unit 13 captures an image of a subject, and supplies a captured image obtained by the image capturing to the control unit 11, and the process proceeds to step S32.

In step S32, the control unit 11 detects a state of the subject by using the captured image supplied from the image capturing unit 13, and the like, and the process proceeds to step S33.

In step S33, the control unit 11 determines whether or not the subject is in a smiling face state (or the subject is likely to enter the smiling face state).

In step S33, in a case where it is determined that the subject does not enter the smiling face state (or is less likely to enter the smiling face state), the process proceeds to step S34. In step S34, the communication processing unit 12 performs outputting of, for example, a "smile" message (displaying of an image or outputting of a voice) that is one of inducement processes, which induce the subject to enter the smiling face state, as the communication process, and then the process returns to step S31.

On the other hand, in step S33, it is determined that the subject enters the smiling face state, the process proceeds to step S35. In step S35, the image capturing unit 13 captures an image of the subject in the smiling face state, and supplies the resultant captured image to the control unit 11. Then, the process proceeds to step S36.

In step S36, the control unit 11 determines whether or not movement blurring is present in the subject who appears on the captured image that is supplied from the image capturing unit 13 in step S35.

In step S36, in a case where it is determined that movement blurring of the subject who appears on the captured image is present, the process proceeds to step S37, and the control unit 11 determines whether or not the captured image, on which movement blurring of the subject is present, is consecutively captured N times (N times represent, for example, the number of times set in advance).

In step S37, it is determined that the image, on which movement blurring of the subject is present, is not consecutively captured N times yet, that is, the number of times of consecutively capturing the image, on which the movement blurring of the subject is present, is less than N times, the process returns to step S31. Then, the same processes are repeated.

In addition, in step S37, in a case where it is determined that the image, on which the movement blurring of the subject is present, is consecutively captured N times, that is, even waiting for a certain time, the subject does not stop and moves violently, and as a result, a captured image without movement blurring cannot be obtained, the process proceeds to step S38. In step S38, the communication processing unit 12 performs outputting of, for example, a "don't move" message that is one of inducement processes of inducing the subject to enter a stationary state as the communication process, and then the process returns to step S31.

In addition, in step S36, in a case where it is determined that the movement blurring of the subject, who appears on the captured image, is not present, that is, in a case where an image of the subject in a state without movement blurring and with a smiling face can be captured, the control unit 11 records the captured image of the subject in a state without movement blurring and with a smiling face in the recording unit 14, and terminates the process.

Furthermore, in FIG. 10, in a case where the image, on which movement blurring of the subject is present, is consecutively captured N times, outputting of the "don't move" message is set to be performed as the communication process of inducing the subject to enter a stationary state, but the N times as so-called threshold value for performing the outputting of the "don't move" message may be set as a variable number of times on the basis of the communication history in addition to fixed times which can be determined in advance.

That is, in a case where the control unit 11 recognizes the subject, and determines that the subject is a subject for which outputting of the "don't move" message was performed in the past, the N times as a threshold value may be set to be less than default times set in advance.

For example, with respect to a subject for which outputting of the "don't move" message was performed a plurality of times in the past, for example, the N times as a threshold value may be set to 0 times, and in case where a captured image with movement blurring is obtained, outputting of the "don't move" message can be performed instantly.

In this case, for example, in a case where a child who always actively moves around is set as the subject, when a captured image without movement blurring cannot be obtained, the "don't move" message is output instantly.

<Process of Capturing Image According to Image Capturing Control in Correspondence with Communication Process>

Figure 11:
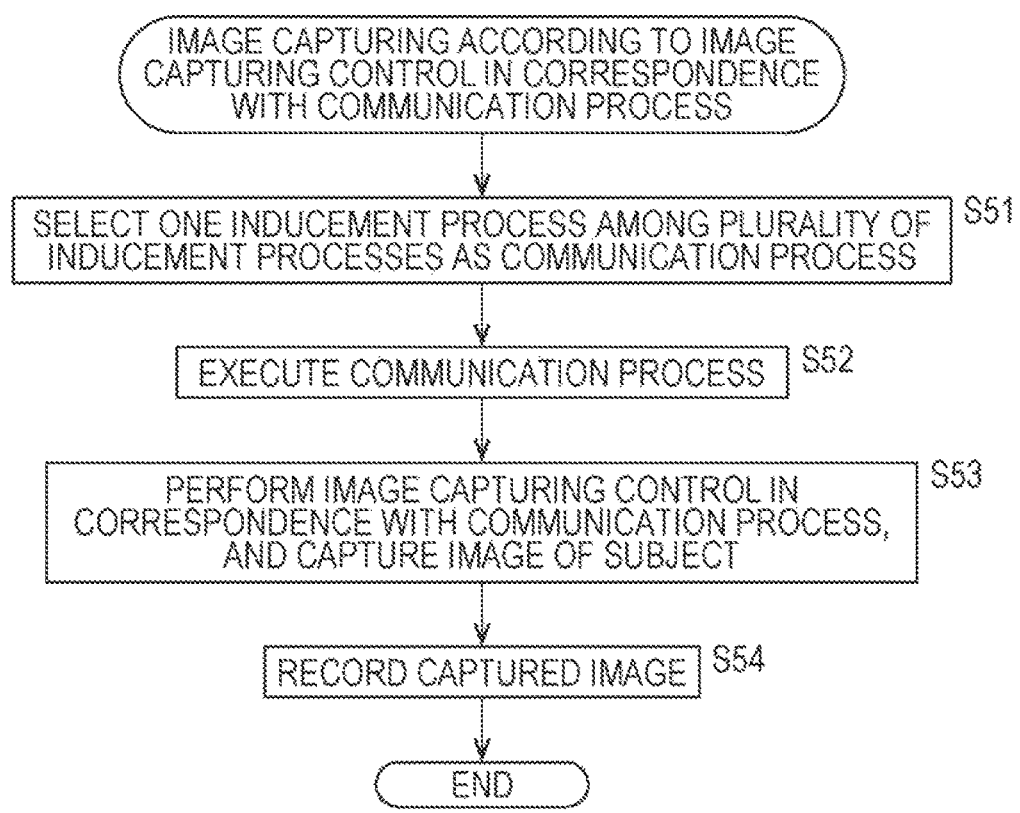
FIG. 11 is a flowchart illustrating an example of an image capturing process in correspondence with image capturing control corresponding to the communication process.

FIG. 11 is a flowchart illustrating an example of image capturing process performed in the image capturing device in FIG. 1 according to an image capturing control in correspondence with the communication process.

Here, for example, as described above, in a case where a child, who always actively moves around, is set as a subject, even when outputting the "don't move" message, the child who is the subject may not stop instantly and continuously move around.

In this case, even when performing image capturing again with the same setting (setting (shutter speed (exposure time), an aperture value, shutter timing, and the like) of the image capturing unit 13) as in a case where a captured image with movement blurring is obtained, there is a high possibility that a captured image with movement blurring is obtained, and thus it is difficult to appropriately capture an image of the subject who is moving around.

Here, the image capturing device in FIG. 1 has a configuration in which image capturing control in correspondence with the communication process is performed, and then image capturing according to the image capturing control can be performed to appropriately capture an image of a subject.

That is, as described above, so as to capture an image of the subject, who moves around, without movement blurring, the following configuration is employed. That is, when the communication processing unit 12 performs outputting of, for example, the "don't move" message as the communication process, for example, the control unit 11 (the image capturing control unit 11B thereof) performs image capturing control of raising a shutter speed in correspondence with the outputting of the "don't move" message, and the image capturing unit 13 raises the shutter speed according to the image capturing control, and captures an image of the subject.

As a result, even when the subject continuously moves around after outputting of the "don't move" message, it is possible to appropriate captures an image of the subject, that is, it is possible to obtain a captured image in which movement blurring is not present or the movement blurring is reduced.

FIG. 11 is a flowchart illustrating the above-described image capturing process.

In step S51, the control unit 11 selects one inducement process among a plurality of inducement processes as the communication process, and controls the communication processing unit 12 to execute the communication process. Then, the process proceeds to step S52.

Then, the selection of the communication process in step S51 can be performed, for example, as described with reference to FIG. 7. In addition, in the selection of the communication process in step S51, as described with reference to FIG. 8, two or more inducement processes may be selected as the communication process in addition to the one inducement process.

In step S52, the communication processing unit 12 executes the communication process selected in step S51 according to control of the control unit 11, and the process proceeds to step S53.

In step S53, the control unit 11 performs image capturing control of controlling the image capturing unit 13 in correspondence with the communication process that is executed by the communication process 12, and the image capturing unit 13 captures an image of the subject according to the image capturing control.

In addition, in step S53, the image capturing unit 13 supplies a captured image obtained through image capturing for the subject to the control unit 11, and the process proceeds to step S54.

In step S54, the control unit 11 records the captured image, which is supplied from the image capturing unit 13, in the recording unit 14, and terminates the process.

As described above, it is possible to appropriately capture an image of the subject by performing the image capturing control in correspondence with the communication process, and by capturing an image of the subject according to the image capturing control.

Hereinafter, description will be given of a specific example of an image capturing process of performing image capturing control in correspondence with the communication process, and capturing an image of a subject according to the image capturing control with reference to a case of capturing an image of a subject in a state without movement blurring, a case of capturing an image of a subject in a jumping state, and a case of capturing an image of a subject in a confronting state as an example.

<Image Capturing Process in Case of Capturing Image of Subject in State without Movement Blurring>

Figure 12:
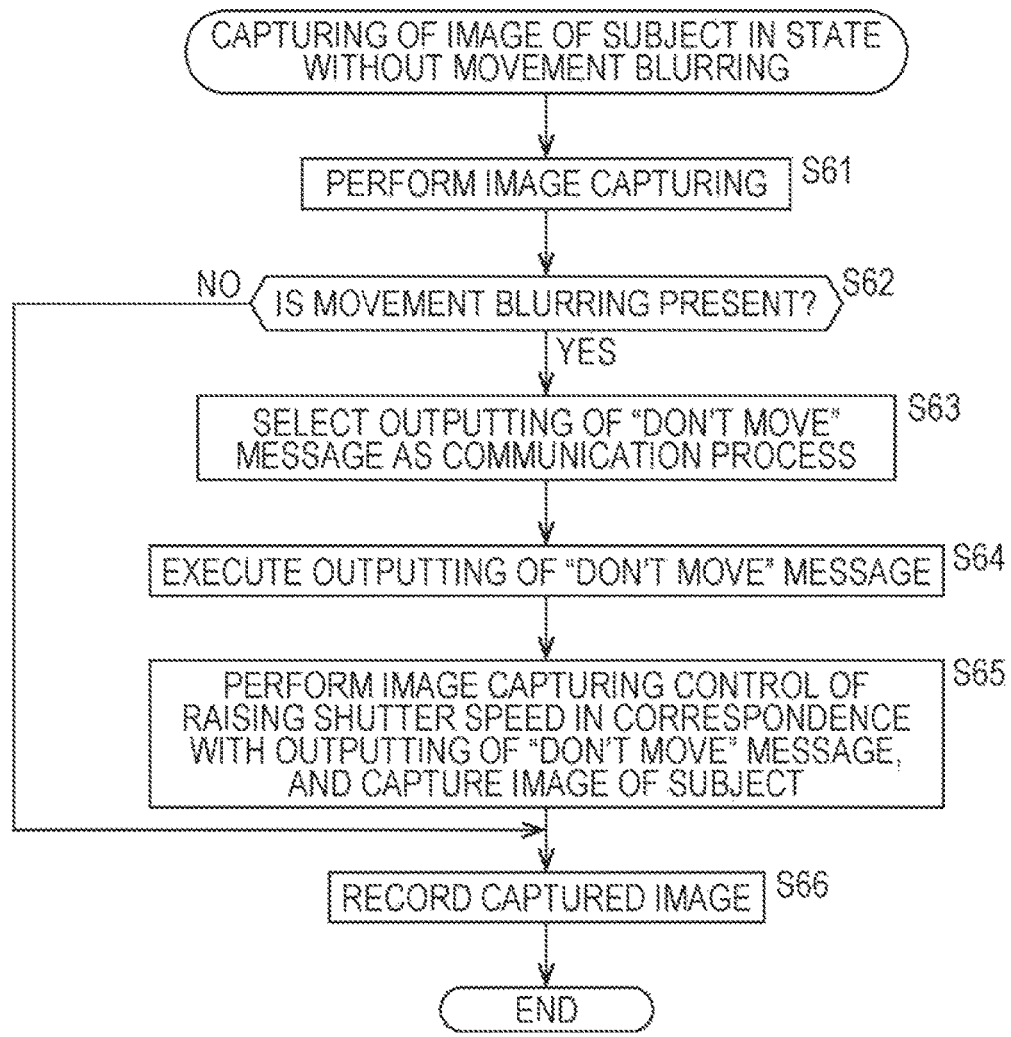
FIG. 12 is a flowchart illustrating an example of an image capturing process in a case of capturing an image of a subject in a state without movement blurring.

FIG. 12 is a flowchart illustrating an example of an image capturing process in a case of capturing an image of a subject in a state without movement blurring.

In step S61, the image capturing unit 13 captures an image of the subject, and supplies the resultant captured image to the control unit 11, and the process proceeds to step S62.

In step S62, the control unit 11 determines whether or not movement blurring is present in the subject who appears on the captured image that is supplied from the image capturing unit 13.

In step S62, in a case where it is determined that movement blurring of the subject, who appears on the captured image, is present, that is, in a case where the subject is moving and the movement blurring of the subject, who appears on the captured image, is present, the process proceeds to step S63.

In step S63, the control unit 11 selects, for example, outputting of the "don't move" message that is one of the inducement processes of inducing the subject to enter a stationary state as the communication process, and controls the communication processing unit 12 to execute the communication process, and then the process proceeds to step S64.

In step S64, the communication processing unit 12 performs outputting of the "don't move" message as the communication process according to control of the control unit 11, and the process proceeds to step S65.

In step S65, the control unit 11 performs image capturing control for the image capturing unit 13 so as to raise a shutter speed in correspondence with the outputting of the "don't move" message as the communication process performed in step S64.

In addition, in step S65, the image capturing unit 13 further raises the shutter speed (make the shutter speed faster) in comparison to a reference value that is set, for example, in a typical auto mode according to the image capturing control of the control unit 11, and captures an image of the subject. The image capturing unit 13 supplies the resultant captured image to the control unit 11, and the process proceeds to step S66.

On the other hand, in step S62, even in a case where it is determined that movement blurring is not present in the subject who appears on the captured image, the process proceeds to step S66.

In step S66, the control unit 11 records the captured image, which is supplied from the image capturing unit 13, in the recording unit 14, and terminates the process.

As described above, in a case where the subject is moving, and thus movement blurring occurs on the captured image, so as to capture an image without movement blurring, in the communication processing unit 12, outputting of the "don't move" message is performed as the communication process, and image capturing control of raising the shutter speed is performed in correspondence with the outputting of the "don't move" message. In addition, in the image capturing unit 13, an image of the subject is captured by raising the shutter speed according to the image capturing control.

Accordingly, after outputting of the "don't move" message, even in a case where the subject is continuously moving, or even in a case where the subject is moving at a low movement speed, it is possible to appropriately capture an image of the subject, that is, it is possible to obtain a captured image in which movement blurring is not present or the movement blurring is reduced.

In addition, in step S65, in addition to the image capturing control of raising the shutter speed, for example, image capturing control of adjusting image capturing timing can be performed.

That is, for example, in a case where outputting of the "don't move" message as the communication process is performed after recognizing a subject, and learning time (hereinafter, the time is also appropriately referred to as "reaction time") taken from outputting of the "don't move" message as the communication process to time at which the subject is stationary, the image capturing control for the image capturing unit 13 can be performed so that timing after passage of the reaction time, which is obtained from the learning, from outputting of the "don't move" message is set to image capturing timing.

The learning of the reaction time may be performed after classification of the subject for every user that becomes the subject, for every age group, for every sex, and the like, and may be performed without the classification.

<Image Capturing Process in Case of Capturing Image of Subject in Jumping State>

Figure 13:
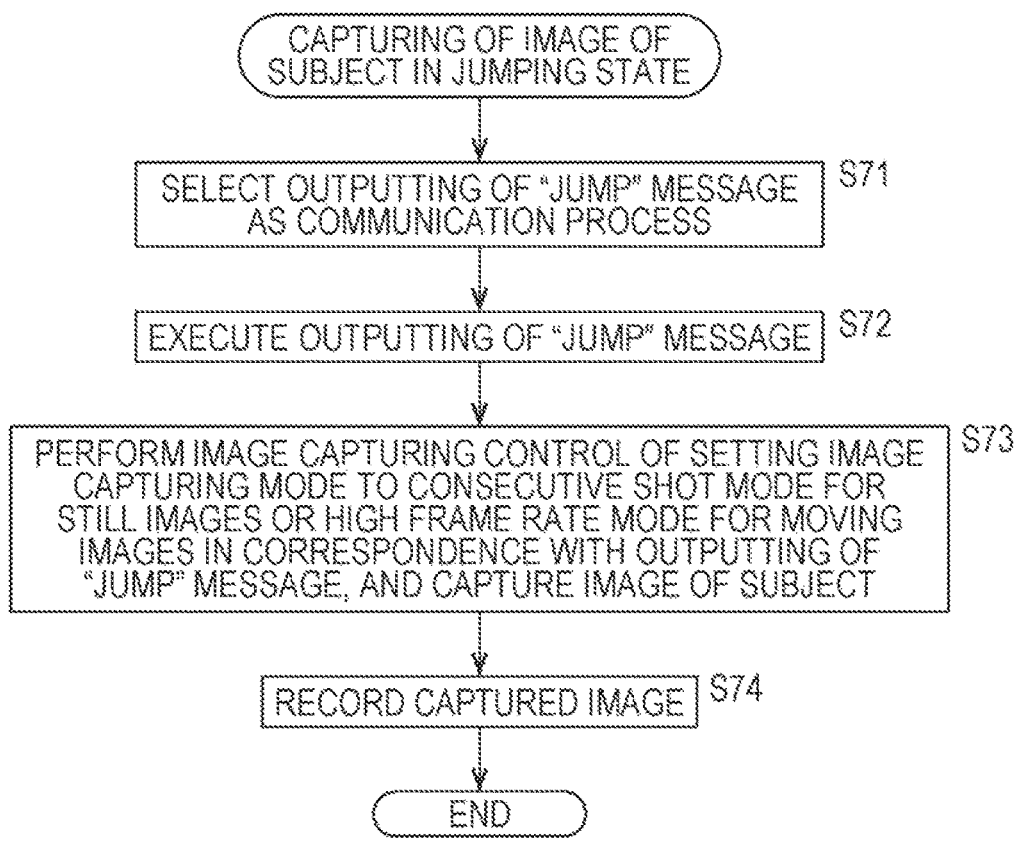
FIG. 13 is a flowchart illustrating an example of an image capturing process in a case of capturing an image of a subject in a jumping state.

FIG. 13 is a flowchart illustrating an example of an image capturing process in a case of capturing an image of a subject in a jumping state.

In step S71, for example, the control unit 11 selects outputting of "jump" message that is one of inducement processes of inducing the subject to enter a jumping state as the communication process, and controls the communication processing unit 12 so as to execute the communication process. Then, the process proceeds to step S72.

In step S72, the communication processing unit 12 performs outputting of the "jump" message as the communication process according to control of the control unit 11, and the process proceeds to step S73.

In step S73, the control unit 11 performs image capturing control for the image capturing unit 13 so as to set an image capturing mode of the image capturing unit 13 to a consecutive shot mode for still images or a high frame rate mode for moving images in correspondence with the outputting of the "jump" message as the communication process that is performed in step S72.

In addition, in step S73, the image capturing unit 13 sets the image capturing mode to the consecutive shot mode for still images or the high frame rate mode for moving images according to the image capturing control of the control unit 11, captures an image of the subject, and supplies the resultant captured image to the control unit 11. Then, and the process proceeds to step S74.

In step S74, the control unit 11 records the captured image, which is supplied from the image capturing unit 13, in the recording unit 14, and terminates the process.

Here, examples of the image capturing mode of the image capturing unit 13 include a moving image mode of capturing moving images, and a still image mode of capturing still images.

In addition, examples of the moving image mode include a normal frame rate mode of capturing moving images at a normal frame rate that is a predetermined frame rate, and a high frame rate mode of capturing moving images at a high frame rate that is a frame rate higher than the normal frame rate.

In addition, examples of the still image mode include a mode of capturing one still image, a consecutive shot mode for still images, and a mode of performing time-lapse image capturing (cut image capturing).

It is possible to appropriately capture an image of a subject who is jumping by performing image capturing control of setting the image capturing mode of the image capturing unit 13 to the consecutive shot mode for still images or the high frame rate mode for moving images in correspondence with the outputting of the "jump" message as the communication process.

That is, the image capturing control of setting the image capturing mode to the consecutive shot mode for still images or the high frame rate mode for moving images is performed in correspondence with the outputting of the "jump" message, and thus image capturing is performed in the image capturing unit 13 in the consecutive shot mode, or the high frame rate mode for moving images.

Accordingly, in a case where the subject jumps with respect to the outputting of the "jump" message, an image of the subject, who is jumping, is captured in the consecutive shot mode or the high frame rate mode for moving images. As a result, it is possible to obtain a captured image in which the subject who is jumping is grasped every moment.

Furthermore, in the image capturing in the high frame rate mode, image capturing may be performed in a state in which the frame rate of moving images is set to a constant high frame rate, and may be performed at a variable frame rate in which, for example, as jumping of the subject goes toward the highest point, the frame rate increases.

In addition, as the image capturing control that is performed in correspondence with the outputting of the "jump" message as the communication process, it is possible to employ control (adjustment) of image capturing timing, control of an effect (picture effect) with respect to a captured image, movement control of the image capturing device, control of image capturing direction of the image capturing unit 13, and the like in addition to the control (setting) of the image capturing mode.

That is, with regard to control of the image capturing timing, for example, the image capturing timing may be controlled so that image capturing is performed at timing at which jumping of the subject reaches the highest point.

With regard to the control of the effect, for example, the effect may be controlled so that an effect of setting blurring to background is executed so as to emphasize the jumping of the subject.

With regard to the movement control of the image capturing device, for example, as illustrated in FIG. 5, in a case where the image capturing device is a movable pet type robot, control of moving the image capturing device may be performed to realize panning in conformity to jumping of the subject.

With regard to the control of the image capturing direction of the image capturing unit 13, for example, as illustrated in FIG. 5, in a case where the image capturing device is a pet-type robot, and the image capturing direction of the image capturing unit 13 can be adjusted by moving the head 51 that is built in the image capturing unit 13, it is possible to perform control of allowing the image capturing direction of the image capturing unit 13 to conform to the subject so as to realize panning in conformity to jumping of the subject.

<Image Capturing Process in Case of Capturing Image of Subject in Confronting State>

Figure 14:
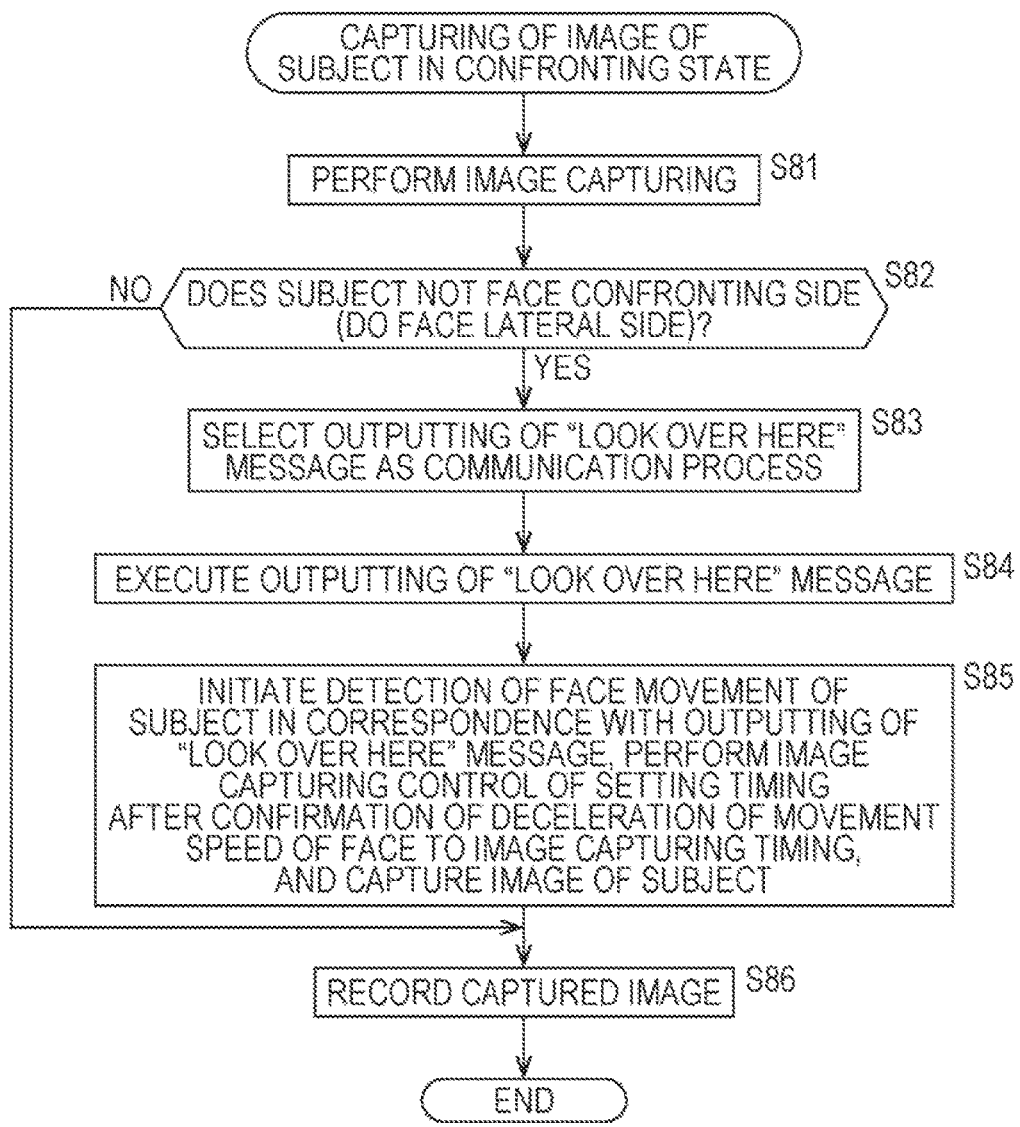
FIG. 14 is a flowchart illustrating an example of an image capturing process in a case of capturing an image of a subject in a confronting state.

FIG. 14 is a flowchart illustrating an example of image capturing process in a case of capturing an image of a subject in a confronting state.

In step S81, the image capturing unit 13 captures an image of the subject, and supplies the resultant captured image to the control unit 11. Then, the process proceeds to step S82.

In step S82, the control unit 11 determines whether or not the subject, who appears on the captured image supplied from the image capturing unit 13, does not face the confronting side (face a lateral side).

In step S82, in a case where it is determined that the subject does not face the confronting side, that is, the subject (face thereof) faces a lateral side, the process proceeds to step S83.

In step S83, the control unit 11 selects, for example, outputting of a "look over here" message that is one of inducement processes of inducing the subject to enter the confronting state as the communication process, and controls the communication processing unit 12 so as to execute the communication process. Then, the process proceeds to step S84.

In step S84, the communication processing unit 12 performs outputting of the "look over here" message as the communication process according to control of the control unit 11. Then, the process proceeds to step S85.

In step S85, the control unit 11 initiates detection of face movement of the subject in correspondence with the outputting of the "look over here" message as the communication process that is performed in step S84, and performs image capturing control for the image capturing unit 13 so that timing after confirmation of deceleration of the face movement as image capturing timing.

In addition, in step S85, the image capturing unit 13 captures an image of the subject at image capturing timing according to the image capturing control of the control unit 11, and supplies the resultant captured image to the control unit 11. Then, the process proceeds to step S86.

On the other hand, in step S82, even in a case where it is determined that the subject, who appears on the captured image, faces a confronting side (does not face a lateral side), the process proceeds to step S86.

In step S86, the control unit 11 records the captured image, which is supplied from the image capturing unit 13, in the recording unit 14, and terminates the process.

As described above, in a case where the subject faces a lateral side and does not face the confronting side, so as to capture an image of the subject in a confronting state, in the communication processing unit 12, outputting of the "look over here" message as the communication process is performed, and image capturing control of setting timing after confirmation of deceleration of the face movement as the image capturing timing is performed in correspondence with the outputting of the "look over here" message. In addition, in the image capturing unit 13, an image of the subject is captured at the image capturing timing according to the image capturing control.

Accordingly, after the outputting of the "look over here" message, since the subject initiates an operation of facing the image capturing direction (of the image capturing unit 13), and confronts the image capturing direction, when the face movement is decelerated, the image capturing is performed at timing after confirmation of deceleration, that is, at timing at which the subject confronts (approximately confronts) the image capturing direction.

As a result, it is possible to appropriately capture an image of the subject, that is, it is possible to obtain a captured image on which a subject in a confronting state appears.

<Selection of Communication Process (Inducement Process as Communication Process)>

Figure 15:
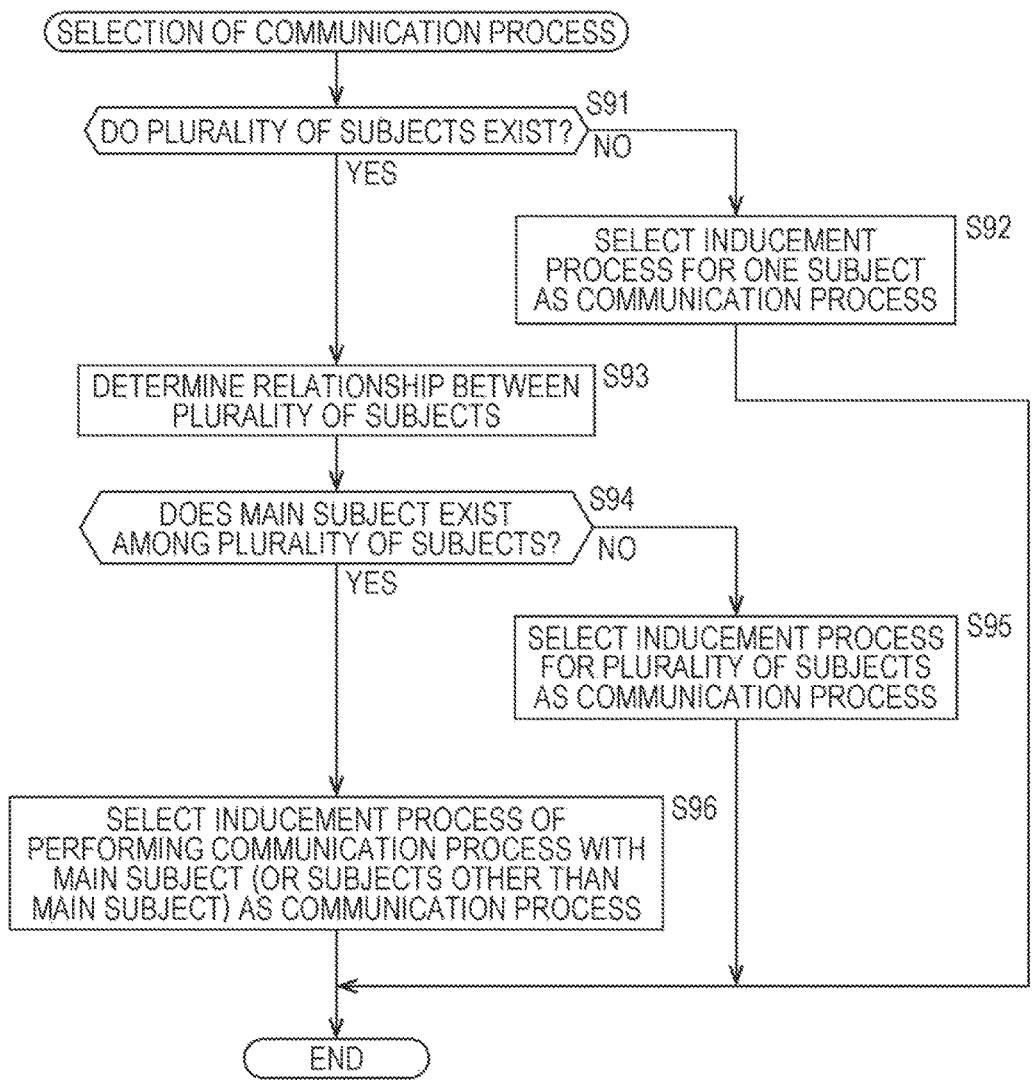
FIG. 15 is a flowchart illustrating an example of a process of selecting one inducement process among a plurality of inducement processes as the communication process.

FIG. 15 is a flowchart illustrating an example of a process of selecting one inducement process among a plurality of inducement processes as the communication process in step S51 in FIG. 11.

In step S91, for example, the control unit 11 determines whether or not a plurality of subjects exist on the basis of a captured image (as a so-called through-image) that is obtained in the image capturing unit 13.

In step S91, in a case where it is determined that the plurality of subjects do not exist, that is, it is determined that the subject is one person, the control unit 11 selects one inducement process for one subject among a plurality of inducement processes as the communication process, and terminates the process.

Here, the plurality of inducement processes include an inducement process for one subject so as to make a communication with the subject, and an inducement process for a plurality of subjects so as to make a communication with a plurality of subjects.

In addition, the inducement process for the plurality of subjects includes an inducement process for a case where a main subject who is a primary subject exists in the plurality of subjects. In addition, the inducement process for a case where the main subject exists includes an inducement process for the main subject so as to make a communication with the main subject among the plurality of subjects, and an inducement process so as to make a communication with subjects other than the main subject.

In step S92, one inducement process for one subject among the plurality of inducement processes is selected as the communication process.

On the other hand, in step S91, in a case where it is determined that a plurality of subjects exist, the process proceeds to step S93, and the control unit 11 determines a relationship between the plurality of subjects who appear on a captured image, for example, on the basis of the captured image that is obtained in the image capturing unit 13. Then, the process proceeds to step S94.

Here, with regard to the relationship between the plurality of subjects, for example, a user who is a photographer may input information (for example, information such as a parent and child relationship of farther (mother) and a son (daughter), and a relationship of friends) of the subjects to the image capturing device, and determination can be made on the basis of the information.

In addition, with regard to the relationship between the plurality of subjects, for example, the control unit 11 can determine the relationship as follows. The control unit 11 estimates the age group or the sex of the subjects who appear on an image that was captured in the past, and learns the relationship between the plurality of subjects on the basis of the estimation result or states (for example, a state in which one subject carries another one subject, a state in which the plurality of subjects stand side by side, and the like) of the plurality of subjects who appear on the captured image. The control unit 11 can determine the relationship on the learning result.

In step S94, the control unit 11 determines whether or not a main subject exists among the plurality of subjects on the basis of the relationship between the plurality of subjects, and the like.

Here, in step S94, for example, in a case where the relationship between the plurality of subjects is a relationship between friends, it is estimated that image capturing of all of the plurality of subjects is intended. Accordingly, particularly, it can be determined that the main subject does not exist.

In addition, in step S94, for example, in a case where the relationship between the plurality of subjects is a relationship between a farther and a child, that is, a parent and child, it is estimated that image capturing of the child is intended. Accordingly, it can be determined that the child is a main subject.

In addition, for example, in a case where a child-priority mode, in which priority is given to the child (baby), is provided as an operation mode of the image capturing device, and a user (photographer) performs an operation of setting the operation mode to the child-priority mode, the child can be regarded as the main subject when the child exists among the plurality of subjects regardless of the determination result about the relationship between the plurality of subjects in step S93.

In step S94, in a case where it is determined that the main subject does not exist among the plurality of subjects, the process proceeds to step S95. In step S95, as the communication process, the control unit 11 selects one inducement process among inducement processes for the plurality of subjects other than the inducement process for a case where the main subject exists, and terminates the process.

In addition, in step S94, in a case where it is determined that the main subject exists among the plurality of subjects, the process proceeds to step S96. In step S96, as the communication process, the control unit 11 selects one inducement process for a main subject among inducement processes for a case where the main subject exists, or one inducement process for making a communication with subjects other than the main subject in accordance with the relationship between the plurality of subjects and the like, and terminates the process.

According to the process of selecting the communication process in FIG. 15, for example, in a case where the relationship between the plurality of subjects is a relationship of a father and a child, that is, a parent and a child, it is determined that a child exists as the main subject.

In addition, examples of the inducement process for a case where the main subject exists include outputting of a message of indirectly inducing the child to enter the smiling face state such as outputting of "you look happy with your father" message in correspondence with the relationship between the plurality of subjects, outputting of contents suitable for the child as the main subject, and the like in addition to outputting of the message for direct inducement of a smiling face such as outputting of the "smile" message in order for the child as the main subject to enter the smiling face state.

Accordingly, in a case where a child exists as the main subject, outputting of one of the inducement processes for the main subject, for example, outputting of the "you look happy with your father" message may be selected as the communication process.

In this case, the "you look happy with your father" message is output to a child as the main subject.

In addition, examples of the inducement process for a case where the main subject does not exist include outputting of an inducement instruction message of giving an instruction for a parent, who is not the main subject, to induce a child as the main subject to enter a predetermined state, and the like as the inducement process for making a communication with subjects other than the main subject.

Examples of the inducement instruction message that can be employed include a message of giving an instruction for a parent, who is not the main subject, to coax a child as the main subject to be an appropriate state such as a smiling face state.

In a case where a child exists as the main subject, outputting of the inducement instruction message, which is one inducement process for making a communication with subjects other than the main subject, can be selected as the communication process.

In this case, the inducement instruction message, which gives an instruction for a parent who is not the main subject to coax a child as the main subject into an appropriate state such as a smiling face state, is output.

Here, for example, the inducement instruction message can be displayed like a so-called crib sheet in the communication processing unit 12.

As described above, in a case where a plurality of subjects exist, for example, an inducement process can be selected as the communication process in consideration of a relationship between the plurality of subjects, for example, a relationship of a parent and a child.

In addition, in a case where the plurality of subjects exist, image capturing control other than selection of the inducement process as the communication process can be performed in consideration of the relationship between the plurality of subjects.

That is, for example, in a case where the plurality of subjects are a parent and a child, and the child as the main subject exists, image capturing control such as adjustment of zoom, adjustment of focus, movement of a pet-type robot as the image capturing device, and adjustment of an image capturing direction in the image capturing unit 13 can be performed to realize framing with focus given to the child as the main subject.

<Image Capturing Control in Correspondence with Communication Process>

Figure 16:
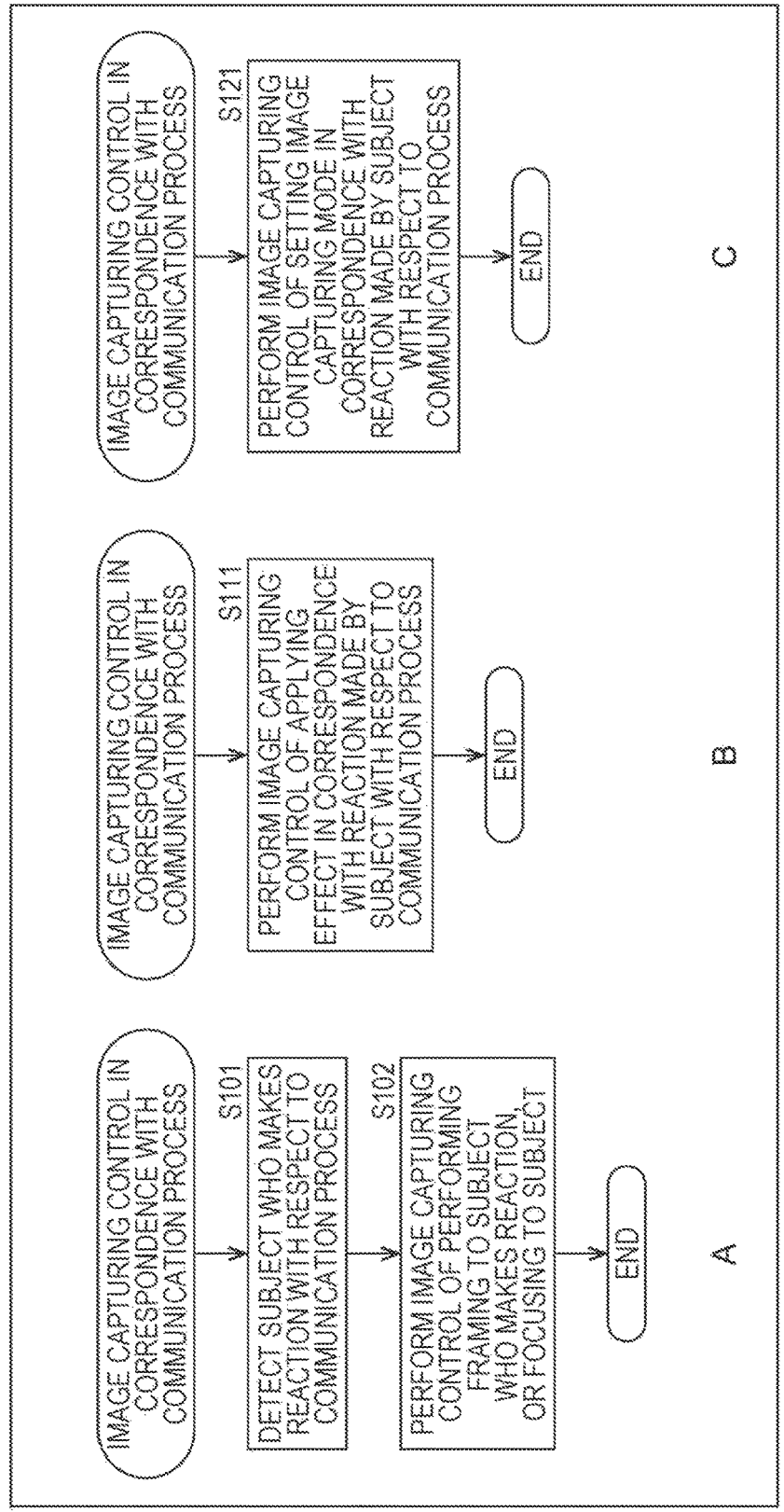
FIG. 16 is a flowchart illustrating an example of image capturing control that is performed in correspondence with the communication process.

FIG. 16 is a flowchart illustrating an example of image capturing control that is performed in correspondence with the communication process in step S53 in FIG. 11.

For example, the image capturing control can be performed in correspondence with a reaction that is made by a subject with respect to the communication process.

A in FIG. 16 is a flowchart illustrating a first example of the image capturing control that is performed in correspondence with the reaction of the subject with respect to the communication process.

In A of FIG. 16, in step S101, the control unit 11 detects a subject who makes a reaction with respect to the communication process. Then, the process proceeds to step S102.

In step S102, the control unit 11 performs image capturing control of performing framing to the subject who makes a reaction with respect to the communication process, or image capturing control of focusing to the subject, and terminates the process.

B of FIG. 16 is a flowchart illustrating a second example of the image capturing control that is performed in correspondence with the reaction of the subject with respect to the communication process.

In B of FIG. 16, in step S111, the control unit 11 performs image capturing control of applying an effect in correspondence with the reaction, which is made by the subject with respect to the communication process, to a captured image, and terminates the process.

Here, as the effect in correspondence with the reaction, which is made by the subject with respect to the communication process, for example, in a case where the subject makes a reaction of jumping, an effect capable of effectively exhibiting the jumping can be employed.

In addition, for example, in a case where the subject makes a reaction of smiling, an effect (for example, overlaying of an illustration such as a star and a flower, changing of a background color into pink, and the like) that evokes a feeling of pleasure can be employed.

C of FIG. 16 is a flowchart illustrating a third example of the image capturing control that is performed in correspondence with the reaction of the subject with respect to the communication process.

In C of FIG. 16, in step S121, the control unit 11 performs image capturing control of setting an image capturing mode in correspondence with a reaction that is made by the subject with respect to the communication process, and terminates the process.

Here, as the image capturing mode in correspondence with the reaction that is made by the subject with respect to the communication process, for example, in a case where the subject makes a reaction of a funny movement, a normal frame rate mode for moving images can be employed.

In addition, for example, in a case where the subject makes a reaction of violent movement, a consecutive shot mode for still images can be employed.

<Recording of Captured Image>

Figure 17:
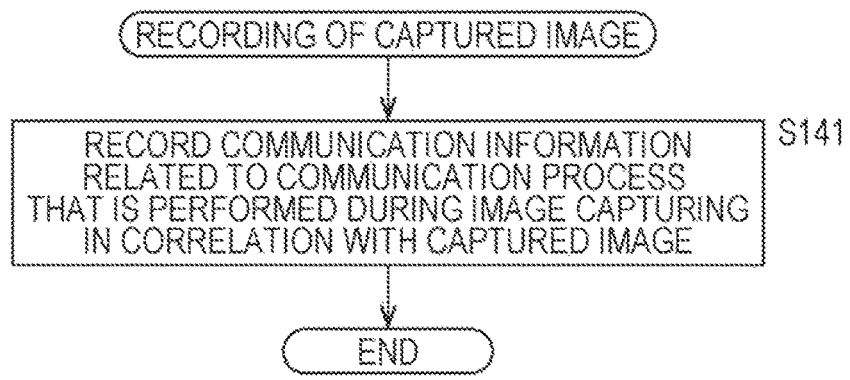
FIG. 17 is a flowchart illustrating an example of a captured image recording process performed by a recording unit 14.

FIG. 17 is a flowchart illustrating an example of a process of recording a captured image, which is performed by the recording unit 14, in step S54 in FIG. 11 (step S66 in FIG. 12, step S74 in FIG. 13, step S86 in FIG. 14, step S16 in FIG. 6, and step S39 in FIG. 10).

In step S141, the recording unit 14 records a captured image, which is supplied from the control unit 11, in correlation with communication information related to the communication process that is performed during capturing of the image, and terminates the process.

Here, as the communication information related to the communication process, for example, information indicating the content (category) of the communication process can be employed.

For example, in a case where the communication process is outputting of the "smile" message, a tag indicating the "smile" message can be employed as the communication information.

The communication information as described above may be recorded as metadata of a captured image, and the communication information can be used in a case of arranging (classifying) captured images, and the like.

In addition, in a case where the communication process is displaying of an image (a moving image or a still image), the image (including a reduced image of the image, a symbolized image of the image, and the like in addition to the image that is displayed in the communication process) can be employed as the communication information.

In addition, in a case where the communication process is displaying of a moving image, a reaction moving image of a user (hereinafter, also referred to as "reaction moving image") is captured during displaying of the moving image in the communication process, and a moving image, in which the reaction moving image is added immediately after the moving image displayed in the communication process, can be employed as the communication information.

In this case, it is possible to confirm the moving image that is displayed in the communication process during image capturing of the captured image, and the reaction made by the subject from the moving image.

In addition, in a case where the communication process is displaying of a still image, and the still image displayed in the communication process is employed as the communication information, during reproduction of a captured image, for example, a still image (reduced image thereof) as communication information correlated to the captured image can be overlay-displayed on the captured image.

In this case, it is possible to confirm the still image that is displayed in the communication process that is performed during image capturing of the captured image.

<Learning of Processing Rule of Communication Process and Image Capturing Control>

Figure 18:
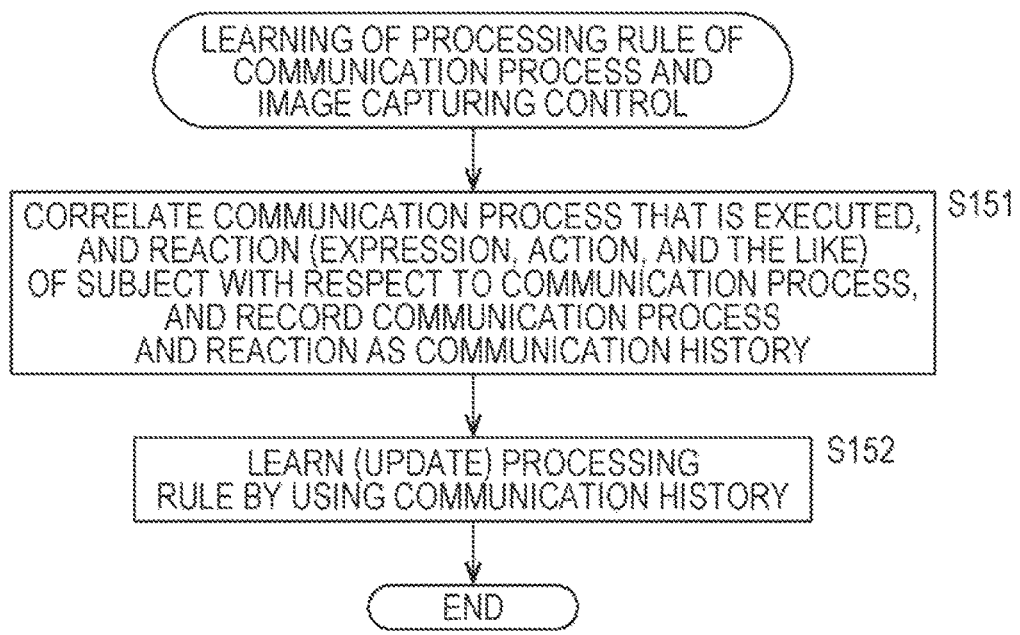
FIG. 18 is a flowchart illustrating an example of a process of learning a processing rule of the communication process and the image capturing control.

FIG. 18 is a flowchart illustrating an example of a process of learning a processing rule of the communication process and the image capturing control.

Here, with regard to the communication process or the image capturing control, for example, the processing rule of the communication process or the image capturing control is learned by using a communication history, which is a history in which a communication process that was performed in the past, and a reaction of a subject with respect to the communication process are correlated, and the subsequent communication process or image capturing control can be performed according to the processing rule that is obtained from the learning.

FIG. 18 is a flowchart illustrating an example of a process of learning of the processing rule as described above (hereinafter, also referred to as "rule learning process")

For example, the rule learning process can be performed after the communication process is executed.

In the rule learning process, in step S151, the control unit 11 correlates a communication process performed by the communication processing unit 12, and a reaction (an expression, an action, and the like) of a subject with respect to the communication process, and records the communication process and the reaction in, for example, the recording unit 14 as a communication history. Then, the process proceeds to step S152.

In step S152, the control unit 11 learns (updates) the processing rule of the communication process (inducement process selected as the communication process) or the image capturing control by using the communication history, and terminates the process.

Here, examples of the processing rule of the communication process include a first rule of determining contents which are output in the communication process, a second rule of determining an output method of outputting the contents in the communication process, a third rule of determining output timing of outputting the contents in the communication process, and the like.

In addition, examples of the processing rule of the image capturing control include a fourth rule of determining image capturing timing, and the like.

In the rule learning process, for example, the first rule can be updated so that contents, in which the degree of smiling of the subject is further raised, are determined as the contents which are output in the communication process. In addition, updating can be made so that contents, which are output in the communication process, are changed between a case where one person exists as the subject, or a case where a plurality of persons exist as the subject.

According to the first rule that is updated in the rule learning process, for example, it is possible to output contents, in which the degree of smiling of the subject is further raised, in the communication process. In addition, it is possible to output contents which are different from each other between the case where one person exists as the subject, and the case where a plurality of persons exist as the subject.

In addition, in the rule learning process, for example, the second rule can be updated so that among methods of outputting contents as a voice and an image, an output method, in which the degree of reaction which represents the advantage of a reaction of the subject is high, is determined as an output method of outputting contents in the communication process.

According to the second rule that is updated in the rule learning process, for example, in the communication process, it is possible to output contents as a voice or an image for which the reaction of the subject is more satisfactory.

In addition, in the rule learning process, for example, the third rule can be updated so that the "don't move" message is output at early timing with respect to a subject in which movement blurring is likely to occur.

According to the third rule that is updated in the rule learning process, for example, in the communication process, the "don't move" message is output at early timing with respect to the subject in which the movement blurring is likely to occur, thereby inducing the subject to be stationary at early timing.

In addition, in the rule learning process, the fourth rule can be updated so that image capturing timing is determined in consideration of time taken to make a reaction by the subject after outputting contents in the communication process.

According to the fourth rule that is updated in the rule learning process, for example, in the communication process, it is possible to control image capturing timing in consideration of time taken to make a reaction by the subject after outputting contents.

<Another Embodiment of Image Capturing Device to which Present Technology is Applied>

Figure 19:
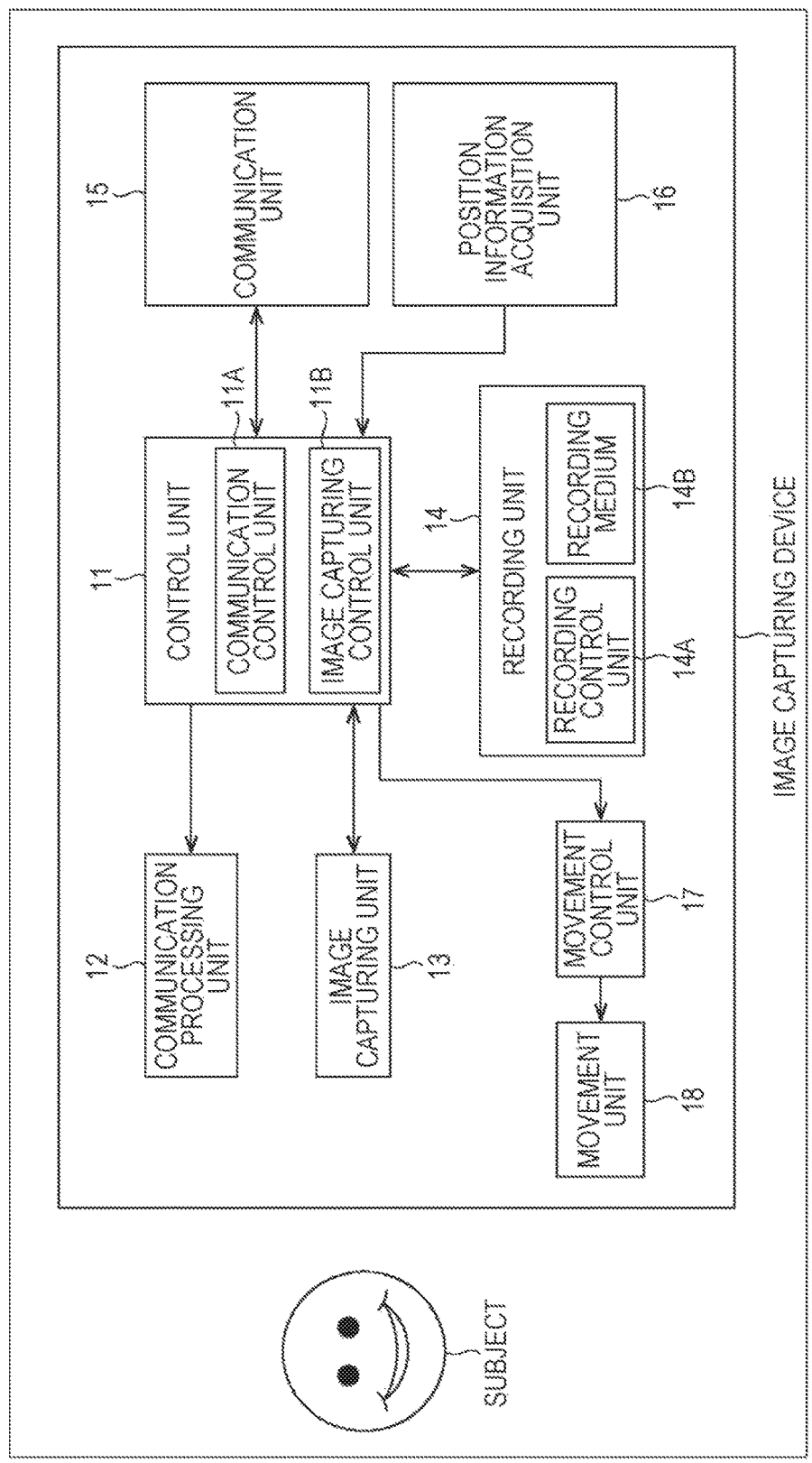
FIG. 19 is a block diagram illustrating a configuration example of another embodiment of the image capturing device to which the present technology is applied.

FIG. 19 is a block diagram illustrating a configuration example of another embodiment of the image capturing device to which the present technology is applied.

Furthermore, in the drawing, the same reference numerals are given to portions corresponding to the case of FIG. 1, and hereinafter, description thereof will be appropriately omitted.

An image capturing device in FIG. 19 is the same as the case of FIG. 1 in that the control unit 11 to the position information acquisition unit 16 are provided. However, the image capturing device in FIG. 19 is different from the case of FIG. 1 in that a movement control unit 17 and a movement unit 18 are provided.

The movement control unit 17 drives the movement unit 18 in accordance with control of the control unit 11 to perform movement control of moving the image capturing device.

For example, the movement unit 18 is a mechanism, which moves the image capturing device, such as legs of the pet-type robot illustrated in FIG. 5, vehicle wheels that allows the image capturing device to travel like an automobile, a propeller (rotor) that allows the image capturing device to fly like a helicopter, and a propeller that allows the image capturing device to travel like a motorboat or a submarine.

In the image capturing device that is configured as described above, the movement unit 18 is driven in accordance with the movement control of the movement control unit 17, and according to this, the image capturing device moves.

According to the movement control by the movement control unit 17, it is possible to perform image capturing control of adjusting the position of the image capturing device or the image capturing direction during image capturing by moving the image capturing device.

<Description of Computer to which Present Technology is Applied>

Next, the series of processes described above can be performed with hardware or software. In a case of performing the series of processes with software, a program, which constitutes the software, is installed in a general-purpose computer and the like.

Figure 20:
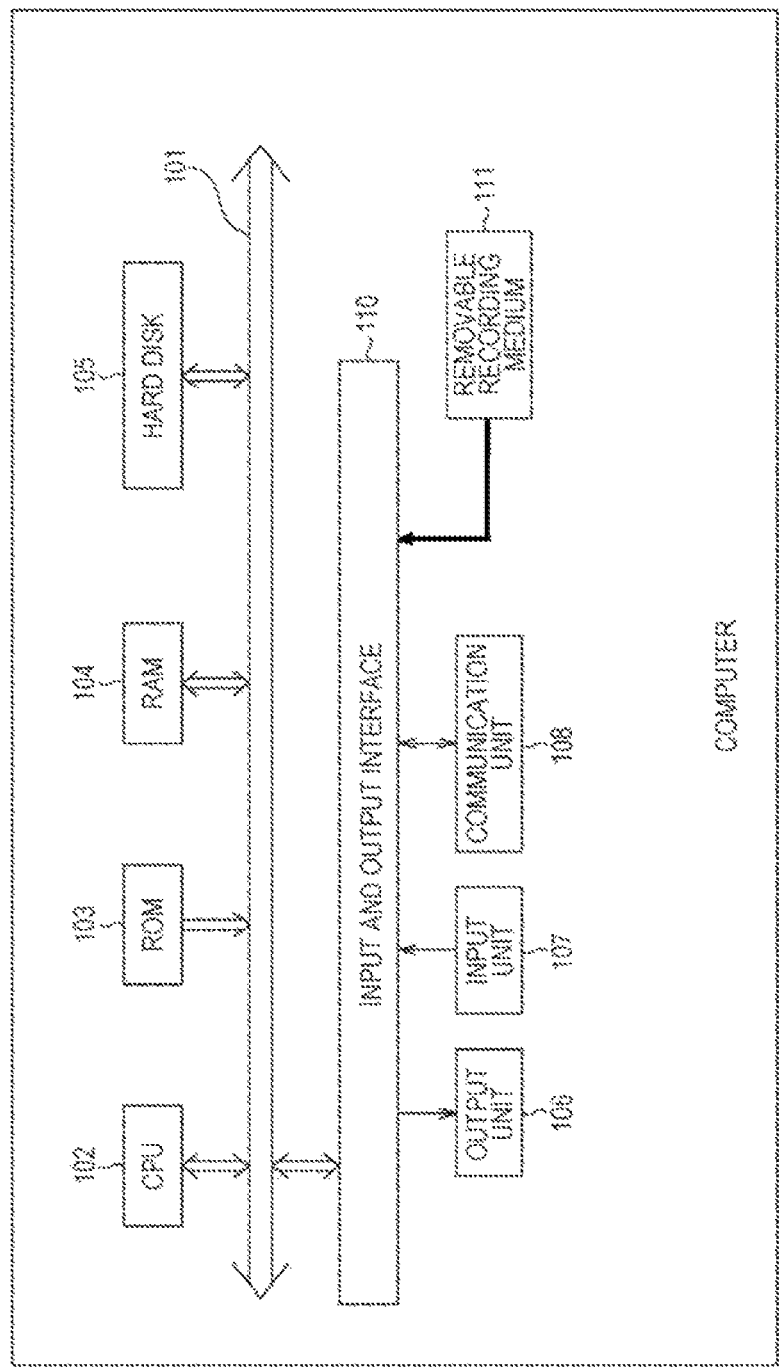
FIG. 20 is a block diagram illustrating a configuration example of an embodiment of a computer to which the present technology is applied.

Here, FIG. 20 illustrates a configuration example of an embodiment of the computer in which the program for execution of the series of processes described above is installed.

The program can be recorded on a hard disk 105 or in a ROM 103 as a recording medium that is built in the computer.

In addition, the program can be stored (recorded) in a removable recording medium 111. The removable recording medium 111 can be provided as so-called package software.

Here, examples of the removable recording medium 111 include a flexible disc, a compact disc read only memory (CD-ROM), a magneto-optical (MO) disc, a digital versatile disc (DVD), a magnetic disk, a semiconductor memory, and the like.

Furthermore, the program can be downloaded to the computer through a communication network or a broadcasting network and can be installed in the built-in hard disk 105 in addition to a configuration in which the program is installed in the computer from the removable recording medium 111 as described above. That is, for example, the program can be transmitted from a downloading site to the computer through a satellite for digital broadcasting in a wireless manner, or can be transmitted to the computer through a network such as a local area network (LAN) and the Internet in a wired manner.

A central processing unit (CPU) 102 is built in the computer, and an input and output interface 110 is connected to the CPU 102 through a bus 101.

When a user operates an input unit 107 to input a command to the CPU 102 through the input and output interface 110, the CPU 102 executes a program that is stored in the read only memory (ROM) 103 in accordance with the command. In addition, the CPU 102 loads a program stored in the hard disk 105 to the random access memory (RAM) 104, and executes the program.

According to this, the CPU 102 executes the processes performed in the above-described flowcharts or the processes performed in accordance with the configurations of the block diagrams. In addition, for example, the CPU 102 allows the processing result to be output from an output unit 106, to be transmitted from a communication unit 108, to be recorded on the hard disk 105, and the like through the input and output interface 110 as necessary.

Furthermore, the input unit 107 is constituted by a keyboard, a mouse, a microphone, and the like. In addition, the output unit 106 is constituted by a liquid crystal display (LCD), a speaker, and the like.

Here, in this specification, it is not necessary for the processes, which are performed by the computer in accordance with the program, to be performed in the sequence described in the flowcharts. That is, the processes, which are performed by the computer in accordance with the program, also include processes (for example, a parallel process or a process by an object) which are executed in parallel or individually.

In addition, the program may be a program that is processed by one computer (processor), or a program that is processed by a plurality of computers in a distributed manner. In addition, the program may be a program that is transmitted to a distant computer for execution.

In addition, in this specification, the system represents an assembly of a plurality of constituent elements (devices, modules (components), and the like), and whether or not all of the constituent elements exist in the same casing does not matter. Accordingly, a plurality of devices which are accommodated in individual casings and are connected to each other through a network, and one device in which a plurality of modules are accommodated in one casing are included in the system.

Furthermore, embodiments of the present technology are not limited to the above-described embodiment, and various modifications can be made in a range without departing from the gist of the present technology.

For example, the present technology can employ a cloud computing configuration in which one function is allotted to a plurality of devices through a network, and is commonly processed.

In addition, the respective steps described in the above-described flowcharts can be allotted to a plurality of devices for execution in addition to execution by one device.

In addition, in a case where a plurality of processes are included in one step, the plurality of processes included in the one step can be allotted to a plurality of devices for execution in addition to execution by one device.

In addition, the effects described in this specification are illustrative only, and other effects may be present.

Furthermore, the present technology can employ the following configurations.

(1) An image capturing device, including:
an image capturing unit that captures an image of a subject;
a communication control unit that controls a communication process of making a communication with the subject; and
an image capturing control unit that performs image capturing control of controlling image capturing, which is performed by the image capturing unit, in correspondence with the communication process.

(2) The image capturing device according to (1),
wherein an inducement process of inducing the subject to enter a predetermined state is performed as the communication process.

(3) The image capturing device according to (1) or (2),
wherein as the image capturing control, control of an image capturing mode is performed.

(4) The image capturing device according to (3),
wherein the image capturing mode includes two or more modes selected among a mode of capturing one still image, a consecutive shot mode for a still image, a mode of performing time-lapse image capturing, a mode of capturing a moving image at a normal frame rate, and a mode of capturing the moving image at a high frame rate.

(5) The image capturing device according to (1) or (2),
wherein the inducement process of inducing the subject to take a predetermined behavior as the communication process.

(6) The image capturing device according to (1), (2), or (5),
wherein control of a shutter speed during image capturing by the image capturing unit is performed as the image capturing control.

(7) The image capturing device according to (1), (2), or (5),
wherein control of image capturing timing of the image capturing unit is performed as the image capturing control.

(8) The image capturing device according to (1), (2), or (5),
wherein control of an effect with respect to an image captured by the image capturing unit is performed as the image capturing control.

(9) The image capturing device according to (1), (2), or (5),
wherein one or both of movement control of the image capturing device and control of an image capturing direction of the image capturing unit are performed as the image capturing control.

(10) The image capturing device according to any one of (1) to (9), wherein the inducement process of inducing the subject to take a predetermined pose is performed as the communication process.

(11) The image capturing device according to (10),
wherein the inducement process of inducing the subject to have a smiling face, the inducement process of inducing the subject to be stationary, or the inducement process of inducing the subject to jump is performed as the communication process.

(12) The image capturing device according to any one of (1) to (9),
wherein the inducement process of inducing image capturing of the subject to be performed in a predetermined direction is performed as the communication process.

(13) The image capturing device according to (12),
wherein the inducement process of inducing the subject to enter a confronting state is performed as the communication process.

(14) The image capturing device according to any one of (1) to (13),
wherein in a case where a plurality of subjects exist, and a main subject who is a primary subject exists among the plurality of subjects, the communication control unit allows a communication process of making a communication with the main subject to be performed.

(15) The image capturing device according to any one of (1) to (14),
wherein the image capturing control unit performs the image capturing control in correspondence with a subject who makes a reaction with respect to the communication process, or the reaction that is made by the subject with respect to the communication process.

(16) The image capturing device according to any one of (1) to (15), further including:
a recording unit that records communication information with respect to the communication process, which is performed during image capturing by the image capturing unit, in correlation with an image captured by the image capturing unit.

(17) The image capturing device according to any one of (1) to (16),
wherein the communication process that is performed, and a reaction that is made by the subject with respect to the communication process are recorded as a communication history in correlation with each other, and the communication process or the image capturing control is performed on the basis of the communication history.

(18) The image capturing device according to any one of (1) to (17), further including:
a communication processing unit that performs the communication process.

(19) An image capturing method, including:
a step of performing image capturing control of controlling image capturing, which is performed by an image capturing unit that captures an image of a subject, in correspondence with a communication process of making a communication with the subject.

(20) A program allowing a computer to function as:
a communication control unit that controls of a communication process of making a communication with a subject; and
an image capturing control unit that performs image capturing control of controlling image capturing, which is performed by an image capturing unit that captures an image of the subject, in correspondence with the communication process.

REFERENCE SIGNS LIST

11 Control unit
11A Communication control unit
11B Image capturing control unit
12 Communication processing unit
13 Image capturing unit
14 Recording unit
14A Recording control unit
14B Recording medium
15 Communication unit
16 Position information acquisition unit
17 Movement control unit
18 Movement unit
21 Main body
22 Liquid crystal panel
31 Main body
32 Output terminal
41 Main body
42 Liquid crystal panel
51 Head
52 Liquid crystal panel
101 Bus
102 CPU
103 ROM
104 RAM
105 Hard disk
106 Output unit
107 Input unit
108 Communication unit
109 Drive
110 Input and output interface
111 Removable recording medium

The invention claimed is:

1. An image capturing device, comprising:
a memory configured to store instructions; and
a computer configured to execute the instructions to:
capture a first image of a subject;
determine a first state of the subject based on the first image;
control an output device to output a signal based on the first state of the subject, wherein the signal corresponds to at least one of a plurality of signal patterns;
determine a second state of the subject,
wherein the second state of the subject corresponds to the at least one of the plurality of signal patterns, and
wherein the second state indicates a movement of the subject from a first position to a second position;
select an image capture mode from a plurality of image capture modes based on the movement of the subject from the first position to the second position, and the at least one of the plurality of signal patterns,
wherein the plurality of image capture modes includes a first mode to capture a still image, a consecutive shot mode for the still image, a second mode to capture a time-lapse image, a third mode to capture a moving image at a normal frame rate, and a fourth mode to capture the moving image at a high frame rate;
capture a second image of the subject based on the selected image capture mode; and
store the second image of the subject in the memory.

2. The image capturing device according to claim 1, wherein the computer is further configured to output the at least one of the plurality of signal patterns, and wherein the at least one of the plurality of signal patterns outputs an indication to the subject to enter the second state.

3. The image capturing device according to claim 2, wherein the second state of the subject is based on the at least one of the plurality of the signal patterns.

4. The image capturing device according to claim 3, wherein the computer is further configured to control a shutter speed of the capture of the second image.

5. The image capturing device according to claim 3, wherein the computer is further configured to control an image capture time of the second image.

6. The image capturing device according to claim 3, wherein the computer is further configured to apply a plurality of picture effects to the second image of the subject.

7. The image capturing device according to claim 3, wherein the computer is further configured to:
control a positional movement of the image capturing device; and
control an image capture direction of the second image based on the positional movement of the image capturing device.

8. The image capturing device according to claim 1, wherein the at least one of the plurality of signal patterns outputs an indication to the subject to enter the second state.

9. The image capturing device according to claim 8, wherein the at least one of the plurality of signal patterns comprises a command, and wherein the command indicates to the subject to one of have a smiling face, be stationary, or jump.

10. The image capturing device according to claim 1, wherein the at least one of the plurality of the signal patterns indicates an image capture direction to the subject.

11. The image capturing device according to claim 10, wherein the at least one of the plurality of signal patterns engages the subject based on the image capture direction.

12. The image capturing device according to claim 1, wherein the computer is further configured to:
capture a third image of a plurality of subjects, wherein the plurality of subjects includes the subject;
determine a main subject from the plurality of subjects; and
determine a third state of the main subject based on the at least one of the plurality of signal patterns.

13. The image capturing device according to claim 1, wherein the computer is further configured to record the second state of the subject based on a correlation between the at least one of the plurality of signal patterns and the first image.

14. The image capturing device according to claim 1, wherein the computer is further configured to:
store, as a communication history, the second state of the subject that is based on the at least one of the plurality of signal patterns, wherein the second state is stored in association with the at least one of the plurality of signal patterns; and
control the image capture mode based on the communication history.

15. The image capturing device according to claim 1, wherein the computer is further configured to capture the second image of the subject based on the second state of the subject.

16. An image capturing method, comprising:
in an image capturing device:
capturing a first image of a subject;
determining a first state of the subject based on the first image;
controlling an output device to output a signal based on the first state of the subject, wherein the signal corresponds to at least one of a plurality of signal patterns;
determining a second state of the subject, wherein the second state of the subject corresponds to the at least one of the plurality of signal patterns, and
wherein the second state indicates a movement of the subject from a first position to a second position;
selecting an image capture mode from a plurality of image capture modes based on the movement of the subject from the first position to the second position and the at least one of the plurality of signal patterns,
wherein the plurality of image capture modes includes a first mode to capture a still image, a consecutive shot mode for the still image, a second mode to capture a time-lapse image, a third mode to capture a moving image at a normal frame rate, and a fourth mode to capture the moving image at a high frame rate;
capturing a second image of the subject based on the selected image capture mode; and
storing the second image of the subject in a memory.

17. A non-transitory computer-readable medium having stored thereon computer-executable instructions, which when executed by a computer, cause the computer to execute operations, the operations comprising:
capturing a first image of a subject;
determining a first state of the subject based on the first image;
controlling an output device to output a signal based on the first state of the subject, wherein the signal corresponds to at least one of a plurality of signal patterns;
determining a second state of the subject,
wherein the second state of the subject corresponds to the at least one of the plurality of signal patterns, and
wherein the second state indicates a movement of the subject from a first position to a second position;
selecting an image capture mode from a plurality of image capture modes based on the movement of the subject from the first position to the second position and the at least one of the plurality of signal patterns,
wherein the plurality of image capture modes includes a first mode to capture a still image, a consecutive shot mode for the still image, a second mode to capture a time-lapse image, a third mode to capture a moving image at a normal frame rate, and a fourth mode to capture the moving image at a high frame rate;
capturing a second image of the subject based on the selected image capture mode; and
storing the second image of the subject in a memory.

* * * * *